US010761729B2

(12) United States Patent
Myers

(10) Patent No.: US 10,761,729 B2
(45) Date of Patent: Sep. 1, 2020

(54) MULTI-CLOUD USER INTERFACE

(71) Applicant: Norman Myers, Los Angeles, CA (US)

(72) Inventor: Norman Myers, Los Angeles, CA (US)

(73) Assignee: Relationship Networking Industry Association, Inc., Los Angeles, CA (US)

( * ) Notice: Subject to any disclaimer, the term of this patent is extended or adjusted under 35 U.S.C. 154(b) by 351 days.

(21) Appl. No.: 15/790,587

(22) Filed: Oct. 23, 2017

(65) Prior Publication Data

US 2018/0113624 A1 Apr. 26, 2018

Related U.S. Application Data

(60) Provisional application No. 62/411,629, filed on Oct. 23, 2016.

(51) Int. Cl.
*G06F 3/048* (2013.01)
*G06F 3/06* (2006.01)
*H04L 29/08* (2006.01)

(52) U.S. Cl.
CPC ............ *G06F 3/0605* (2013.01); *G06F 3/067* (2013.01); *G06F 3/0607* (2013.01); *G06F 3/0653* (2013.01); *H04L 67/10* (2013.01); *H04L 67/2809* (2013.01); *H04L 67/1097* (2013.01)

(58) Field of Classification Search
CPC . H04L 41/22; H04L 67/1097; H04L 67/2809; G06F 3/0605; G06F 3/0607; G06F 3/0653; G06F 3/067
See application file for complete search history.

(56) References Cited

U.S. PATENT DOCUMENTS

| 8,065,199 | B2 | 11/2011 | Dumon et al. | |
| 8,965,771 | B2 | 2/2015 | Kurzweil | |
| 2005/0125229 | A1* | 6/2005 | Kurzweil | G06Q 30/02 704/270 |

(Continued)

OTHER PUBLICATIONS

International Search Report and Written Opinion of the International Searching Authority; International Application No. PCT/US17/57913; dated Dec. 27, 2017.

*Primary Examiner* — Claudia Dragoescu
(74) *Attorney, Agent, or Firm* — Fitch, Even, Tabin & Flannery LLP

(57) ABSTRACT

A multi-cloud user interface apparatus facilitates transparent use of multiple Internet-based clouds. A network interface compatibly interacts with the multiple Internet-based clouds, a database management system of information, and a user interface that includes a non-human agent. The database management system pertains to a world model that represents a plurality of entities such as workgroups, products, humans, animals, plants, positions, and assets. The database itself can be configured such that the items of information are partially but not wholly stored on individual ones of each of the multiple Internet-based clouds. The non-human agent can be configured to receive input from a human user and to respond to the input by accessing the database. The nature of the response can be automatically derived as a function of an information relevance measurement that is itself calculated as a function, at least in part, of an entity relationship-based metric.

17 Claims, 27 Drawing Sheets

(56) References Cited

U.S. PATENT DOCUMENTS

| | | | |
|---|---|---|---|
| 2010/0262495 A1* | 10/2010 | Dumon | G06Q 30/02 705/14.54 |
| 2011/0010691 A1* | 1/2011 | Lu | G06F 11/3688 717/124 |
| 2012/0047107 A1* | 2/2012 | Doddavula | G06F 9/5083 707/620 |
| 2012/0047339 A1* | 2/2012 | Decasper | G06F 11/1076 711/162 |

* cited by examiner

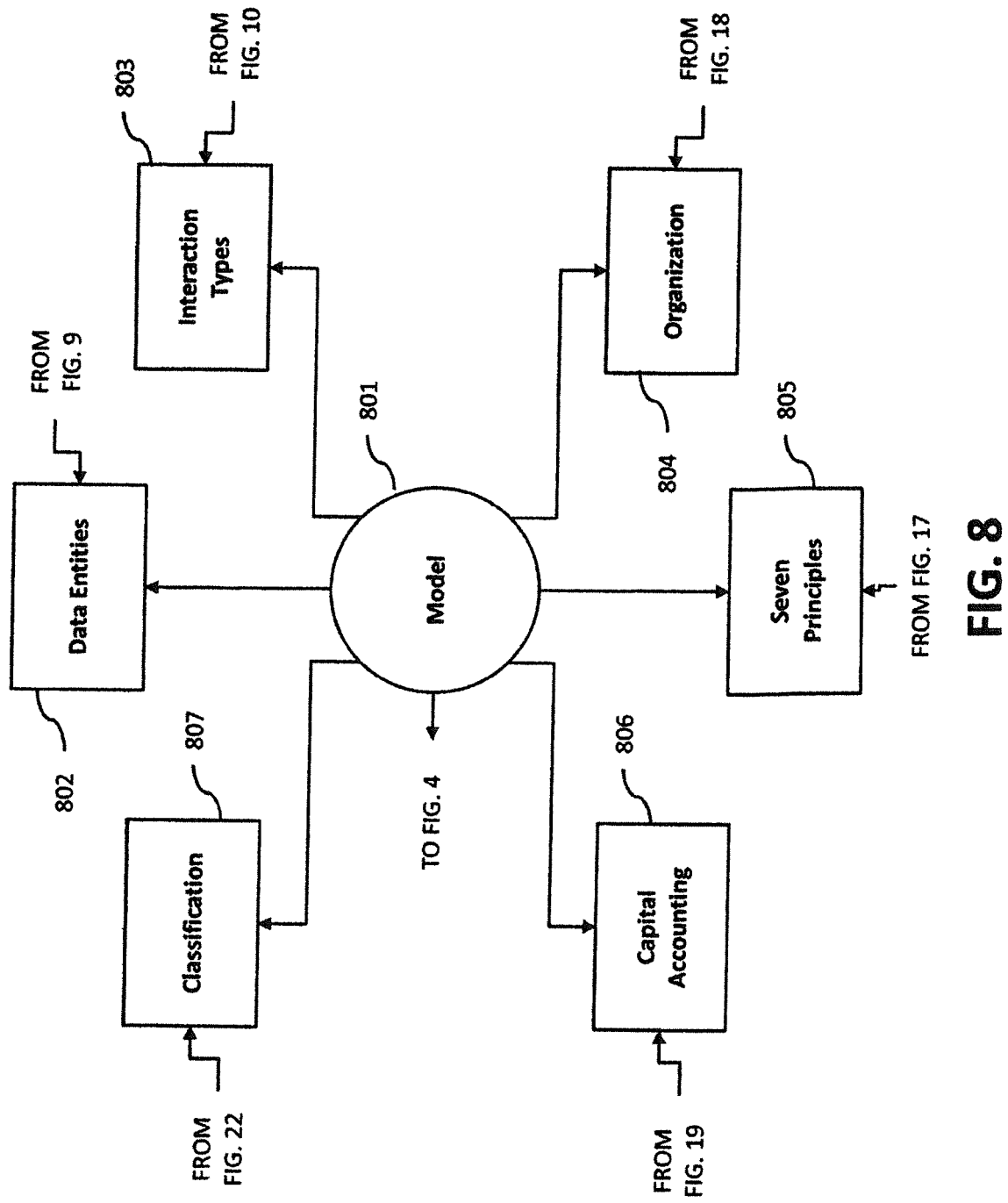

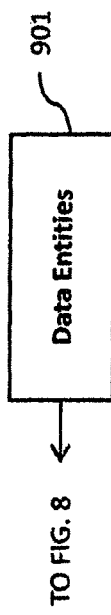

| | Title | Represents |
|---|---|---|
| Life | Person 902 | A human being. Living or deceased. Or a fictional counterpart. |
| Life | Animal 903 | An animal. Living or not. Or a fictional counterpart. |
| Life | Plant 904 | A plant. Living or not. Or a fictional counterpart. |
| Organization | Workgroup 905 | A for-profit or non-profit organization, such as a team, department, company, multi-national, government, common-interest group, or sole proprietor. |
| Organization | Position 906 | A job, paid or unpaid. Or a role in a team, committee or board. Even if the job or role is unfilled. |
| Organization | Product 907 | A tangible or intangible good or service held for sale, delivery or exchange by a workgroup. Or the end result of a project. |
| Organization | Asset 908 | A tangible good or intellectual property owned by a workgroup or a person. |
| Idea | Other 909 | An entity that cannot be defined by a Life or Organization data entity. |

FIG. 9

| Seven Principles → | Principle | Definition |
|---|---|---|
| | Accountability 1702 | Acceptance of liability for the consequences of choices; consideration of the long-term effect of one's actions. |
| | Boundaries 1703 | Limitations imposed to indicate what is permissible within one's value system. |
| | Honesty 1704 | The quality of communicating and acting truthfully, stating facts and views as best as possible, both internally and to others. |
| | Respect 1705 | The positive feeling of esteem for self or for another. |
| | Responsibility 1706 | The sense that one's own actions are the source or cause of outcomes; the ability to act without guidance or superior authority. |
| | Support 1707 | The act of giving help, moral or psychological assistance, or advocacy, either to self or to another. |
| | Trust 1708 | The confident expectation of another's reliability, or of one's own reliability. |
| ↓ TO FIG. 8 | Interactions | |

MULTI-CLOUD USER INTERFACE

RELATED APPLICATION(S)

This application claims the benefit of U.S. Provisional application No. 62/411,629, filed Oct. 23, 2016, which is incorporated by reference in its entirety herein.

TECHNICAL FIELD

These teachings relate generally to cloud architecture and usage.

BACKGROUND

The Internet contains a vast store of information. Unfortunately, accessing and utilizing that information to accomplish a particular task can be cumbersome and/or require considerable training and experience on the part of the user. These issues grow exponentially as the task at hand itself comprises a plurality of tasks that all require separate consideration and resolution. The very infrastructure that constitutes the Internet contributes greatly to these concerns and burdens.

BRIEF DESCRIPTION OF THE DRAWINGS

The above needs are at least partially met through provision of the multi-cloud user interface apparatus and method described in the following detailed description, particularly when studied in conjunction with the drawings, wherein:

FIG. 8 comprises a block diagram as configured in accordance with various embodiments of these teachings;

FIG. 9 comprises a data entity chart as configured in accordance with various embodiments of the invention;

FIG. 17 comprises an interactions chart as configured in accordance with various embodiments of these teachings;

Figure 1:
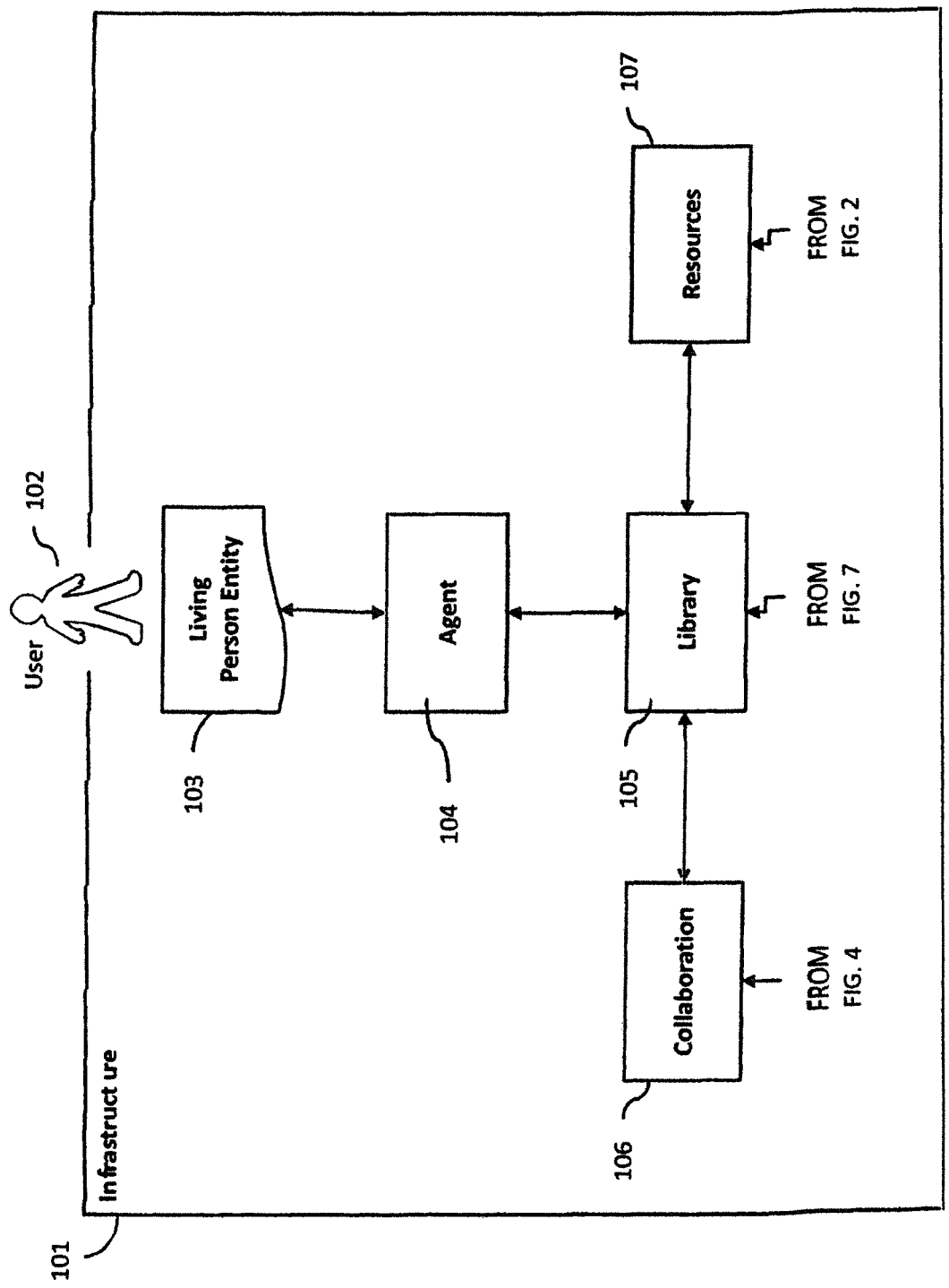
FIG. 1 comprises a flowchart as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments a multi-cloud user interface apparatus serves to facilitate transparent use of multiple Internet-based clouds. This apparatus can include a network interface (configured to compatibly interact with the multiple Internet-based clouds), a database management system of information, and a user interface operably coupled to the network interface and which includes a non-human agent.

By one approach the aforementioned database management system pertains to information having stored therein a world model that represents a plurality of entities. Examples of an entity include workgroups, products, humans, animals, plants, positions, and assets. The database itself can be configured such that the items of information are partially but not wholly stored on individual ones of each of the multiple Internet-based clouds. So configured, the database in its entirety is wholly stored on the multiple Internet-based clouds but not all of the database is stored on any one of the Internet-based clouds. These teachings will accommodate having at least portions of the database being redundantly stored on more than a single one of the multiple Internet-based clouds.

By one approach, the aforementioned non-human agent is configured to receive input from a human user and to respond to the input by accessing the database. The nature of the response can be automatically derived as a function, at least in part, of an information relevance measurement. The information relevance measurement, in turn, may be calculated as a function, at least in part, of a monetary metric and/or as a function of an entity relationship-based metric.

By one approach, the aforementioned non-human agent can comprise, at least in part, an avatar for the human user. These teachings will accommodate presenting the avatar as a visual avatar in the form of a two-dimensional or three-dimensional animated avatar as desired. These teachings will also accommodate making use of an audio-based avatar or even a text-based avatar.

By one approach the above-described apparatus further includes a broker subsystem that comprises a dispatcher subsystem to direct both storage and retrieval of data and applications. The broker subsystem can also comprise a buyer subsystem to determine when additional cloud resources are needed to service the multi-cloud and/or to signal a buyer apparatus to act.

So configured, these teachings permit the inherent architecture of the Internet to be utilized and leveraged in ways not previously anticipated or employed. These teachings are further able to facilitate that usage/leveraging in a way that decreases, rather than increases, expectations and cognitive loading for the user.

These and other benefits may become clearer upon making a thorough review and study of the following detailed description. Referring now to the drawings, and in particular to FIGS. 1-24, an illustrative system that is compatible with many of these teachings will now be presented.

Referring first to FIG. 1, a general infrastructure 101 that comports with these teachings serves a human user 102. (In fact, many users, up to and including the whole of humanity, can be supported in a similar manner. For the sake of clarity and simplicity, however, the examples presented herein presume only a single primary user.) Data regarding this user 102 is recorded in a data entity 103 that represents this user 102. The data entity 103 communicates with a software agent 104 that in turn links to an information library 105. This information library 105 in turn links to both a collaboration facility 106 and to a variety of cloud resources 107.

Figure 2:
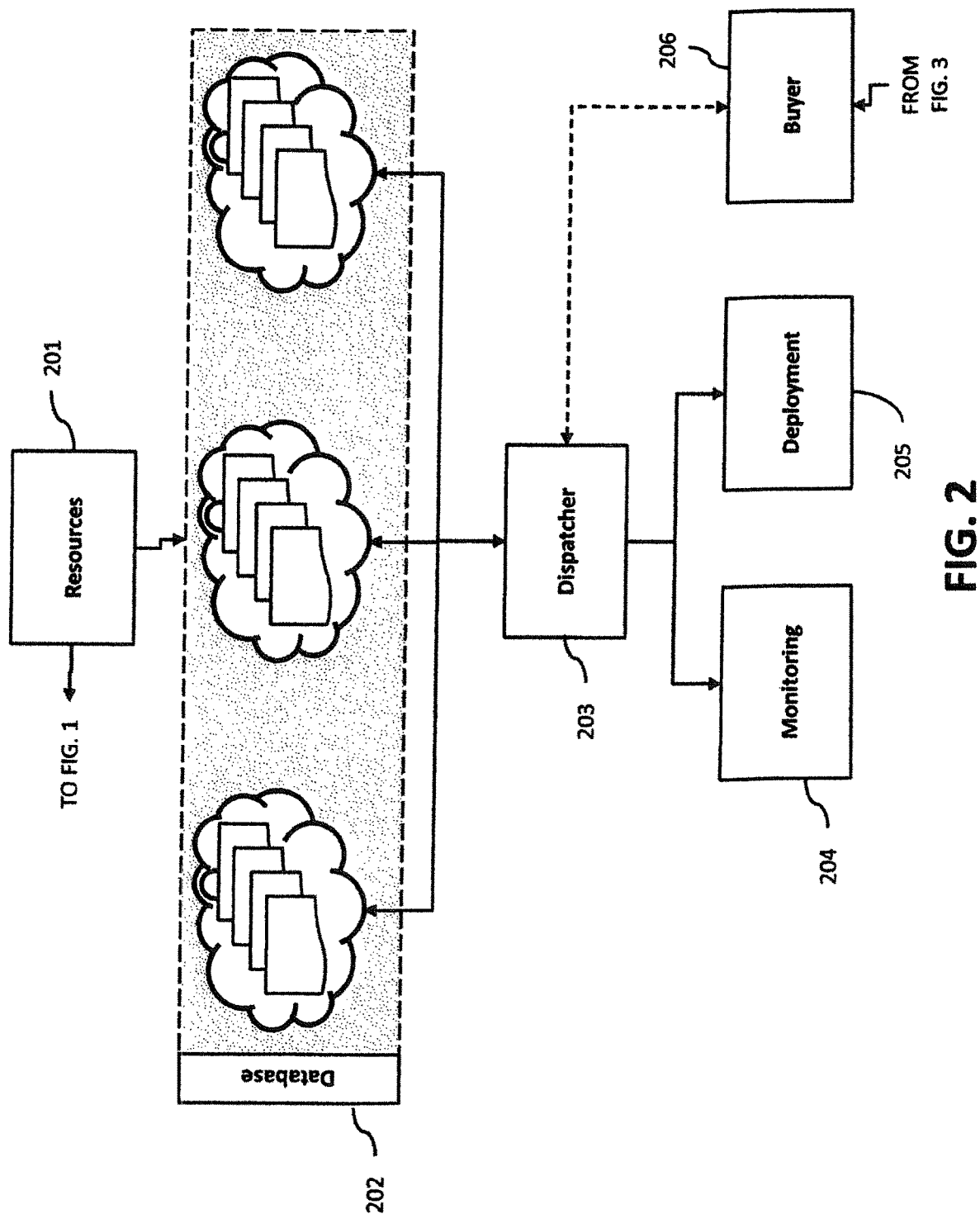
FIG. 2 comprises a flowchart as configured in accordance with various embodiments of these teachings.

FIG. 2 presents further details regarding the aforementioned cloud resources 107. In particular, these cloud resources 107 draw upon informational resources 201 that are sourced by a database 202 comprised of a plurality of cloud-based databases. By one approach, and as illustrated, a dispatcher 203 is configured to have both a monitoring 204 and deployment 205 capability to thereby permit the dispatcher to monitor the available cloud services and to deploy those cloud services as needed to support the aforementioned library 105. (FIG. 2 also illustrates a so-called buyer 206 that will be described below.)

Figure 4:
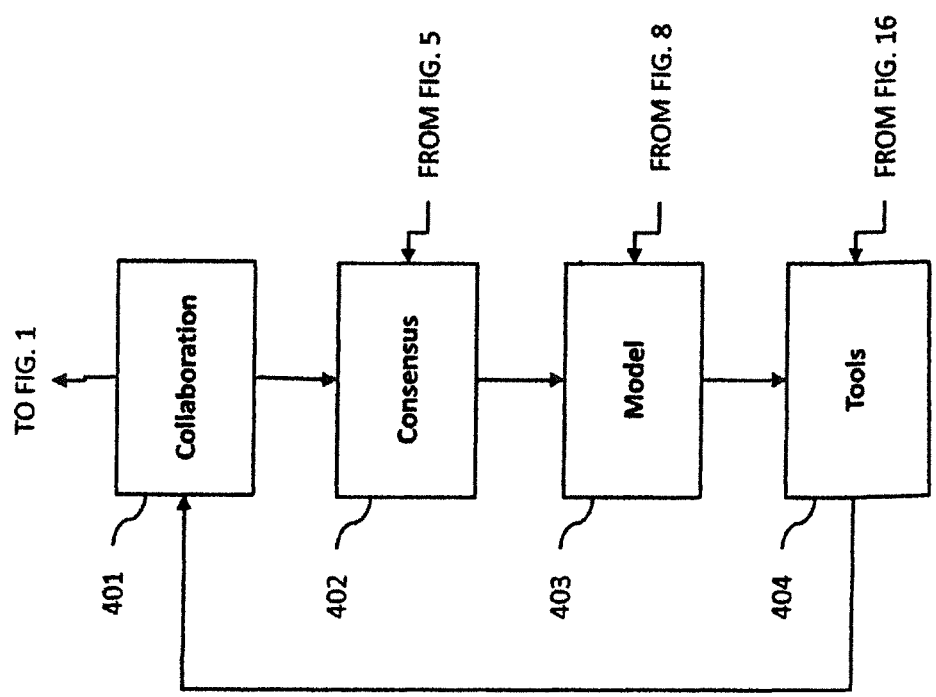
FIG. 4 comprises a flowchart as configured in accordance with various embodiments of these teachings.

FIG. 4 presents further details regarding the aforementioned collaboration facility 106. This collaboration facility employs a consensus capability 402 that serves, at least in part, to define a model 403 that in turn serves to create collaborative software tools 404. The latter then facilitate a user-collaboration capability 401 with respect to the creation, development, and maintenance of various aspects of this infrastructure 101.

Figure 5:
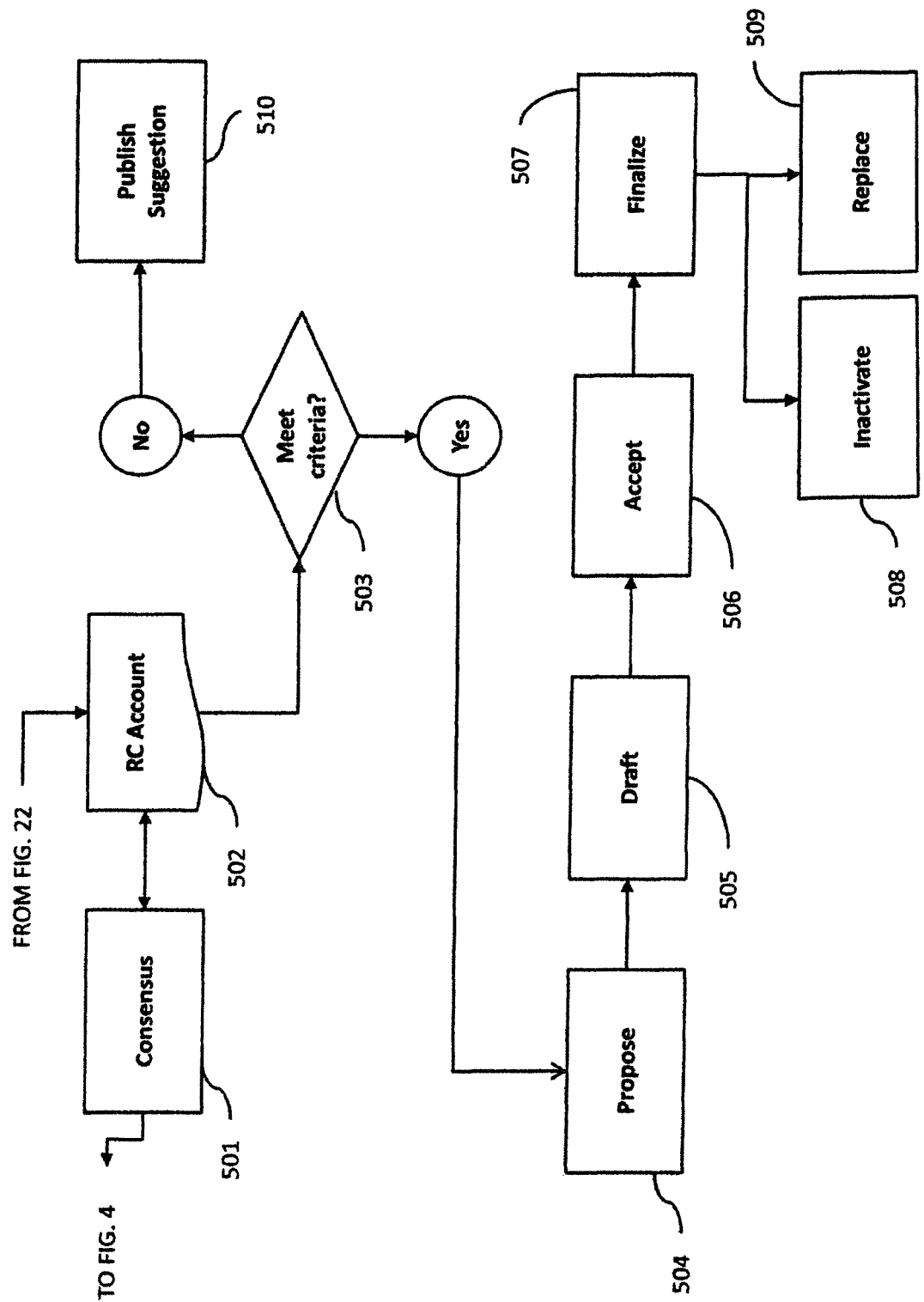
FIG. 5 comprises a flowchart as configured in accordance with various embodiments of these teachings.
Figure 6:
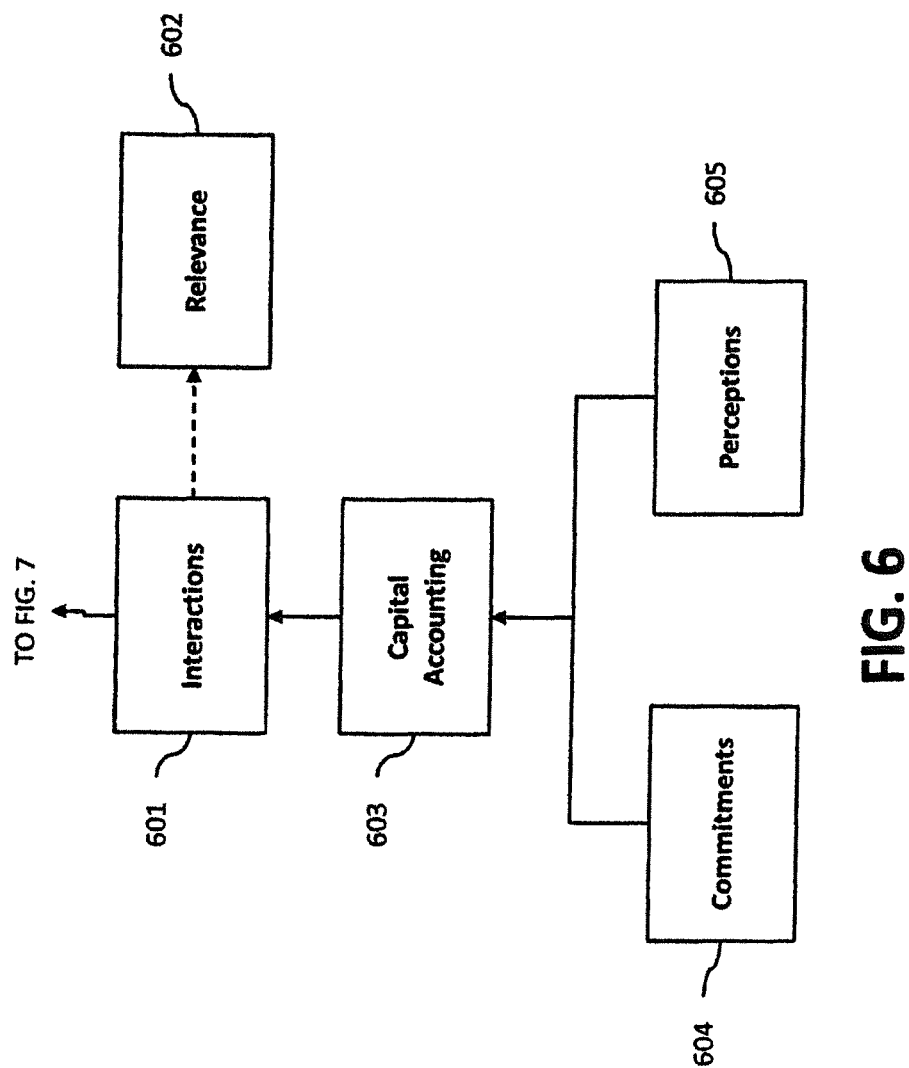
FIG. 6 comprises a flowchart as configured in accordance with various embodiments of these teachings.

FIG. 5 presents further details regarding the aforementioned consensus capability 402. Pursuant to this approach, consensus 501 is reached among qualified persons. To be qualified, a person must possess a pre-defined relationship-based metric balance 502. Persons who fail to meet the criteria 503 may only publish a suggestion 510. The consensus process enables persons to collaboratively propose ideas 504, embody them in draft documents 505, "accept" the documented results 506, and publish them in final form 502. The newly-finalized results can be used to replace existing infrastructure aspects 509, or may be inactivated 508.

FIG. 8 presents further details regarding the aforementioned model 403/801. In this illustrative example, the resultant model 801 is defined as a conceptual representation of a system using general rules and concepts. More particularly, the model includes definitions of eight data entities 802, a plurality of interaction types 803, infrastructure organization information 804, seven relationship principles 805, capital accounting information 806, and a classification system 807. Each of these components will now be described in more detail.

FIG. 9 illustrates exemplary data entities 802/901 that comprise a part of the model 801. These data entities include life-based entities, organization-based entities, and idea-based entities. Life-based entities can include people 902 (including both living or deceased human beings or even fictional characters if desired), non-human animals 903 (including, again, living, deceased (including extinct), or fictional animals, and plants 904 (including, again, living, deceased, or fictional plants).

Organization-based entities can include a workgroup 905 such as a for-profit or non-profit organization, with useful examples including a (professional or amateur) team, department, company, multi-national entity, government, common-interest group, or sole proprietorship, to note but a few examples in these regards. (Other examples might include any of a variety of sovereign entities such as native American tribes, partnerships, receiverships, trusts, consortiums, joint ventures, fraternal organizations, public-service organizations, and so forth.) Organization-based entities can also include a position 906, wherein the expression "position" will be understood to refer to a title or untitled job or other hierarchical or bureaucratic role (paid or unpaid) including on a team, committee, board, or the like.

These teachings will accommodate treating a particular position as a data entity even if the particular job/role is unfilled or merely prospective. Organization-based entities can further include a product 907, such as a tangible or intangible good or service offered for sale, delivery, or exchange by, for example, a workgroup or that is otherwise the end result of, for example, a project. And as yet another example, organization-based entities can include an asset 908 such as a tangible good or intellectual property right owned, for example, by a workgroup or a person.

These teachings are flexible in practice. Accordingly, by one approach a data entity can comprise an "other" category 909 to thereby include an entity that cannot be defined as a life-based or organization-based data entity. An unrealized and unperfected idea is one such example.

Figure 10:
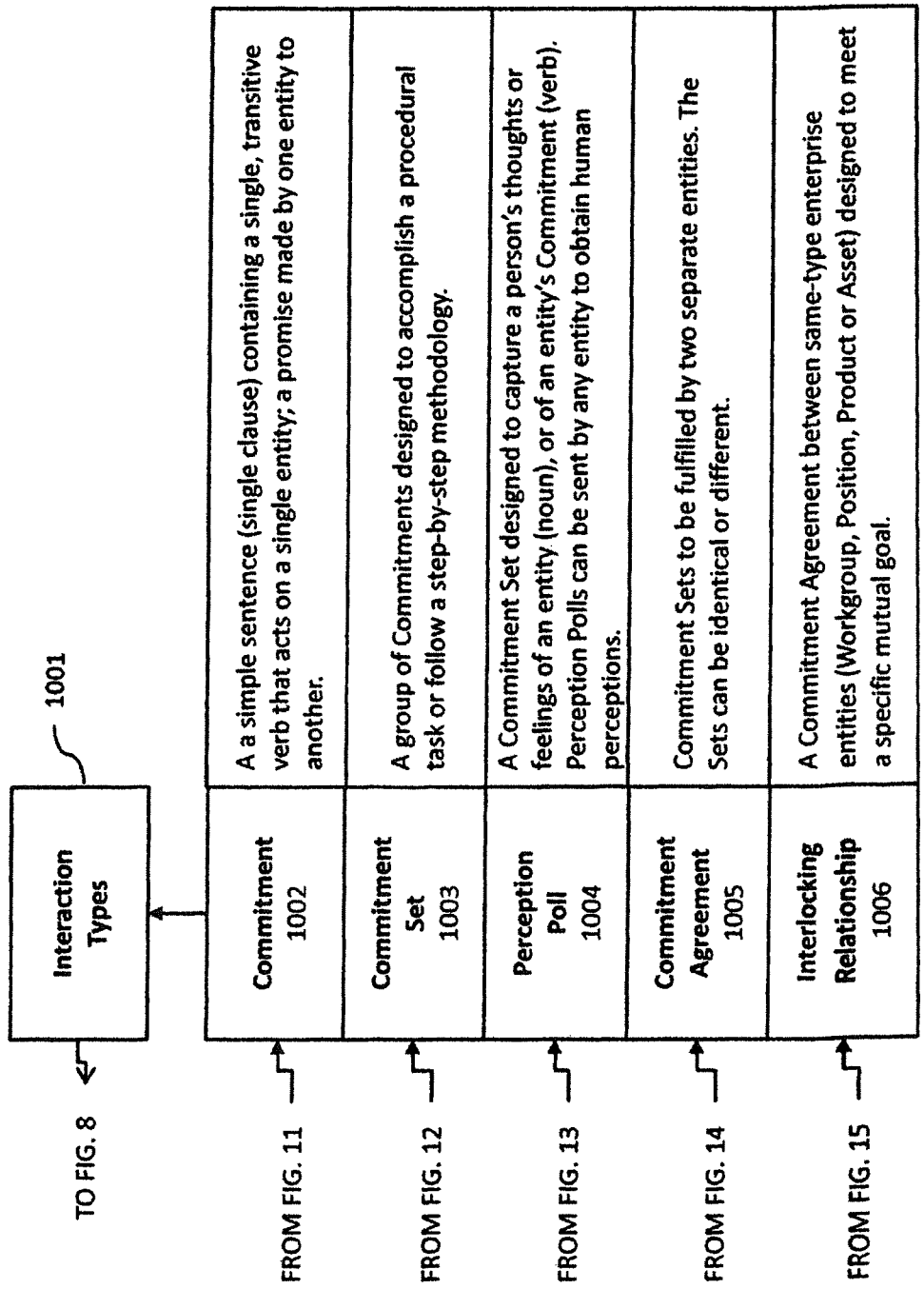
FIG. 10 comprises an interaction-type chart as configured in accordance with various embodiments of these teachings.

FIG. 10 illustrates exemplary interaction types 803/1001 that comprise a part of the model 403/801. In this particular illustrative example there are five different interaction types. These five interaction types pertain to commitment 1002, a commitment set 1003, a perception poll 1004, commitment agreement 1005, and interlocking relationships 1006. Each of these interaction types will now be described in more detail.

Figure 11:
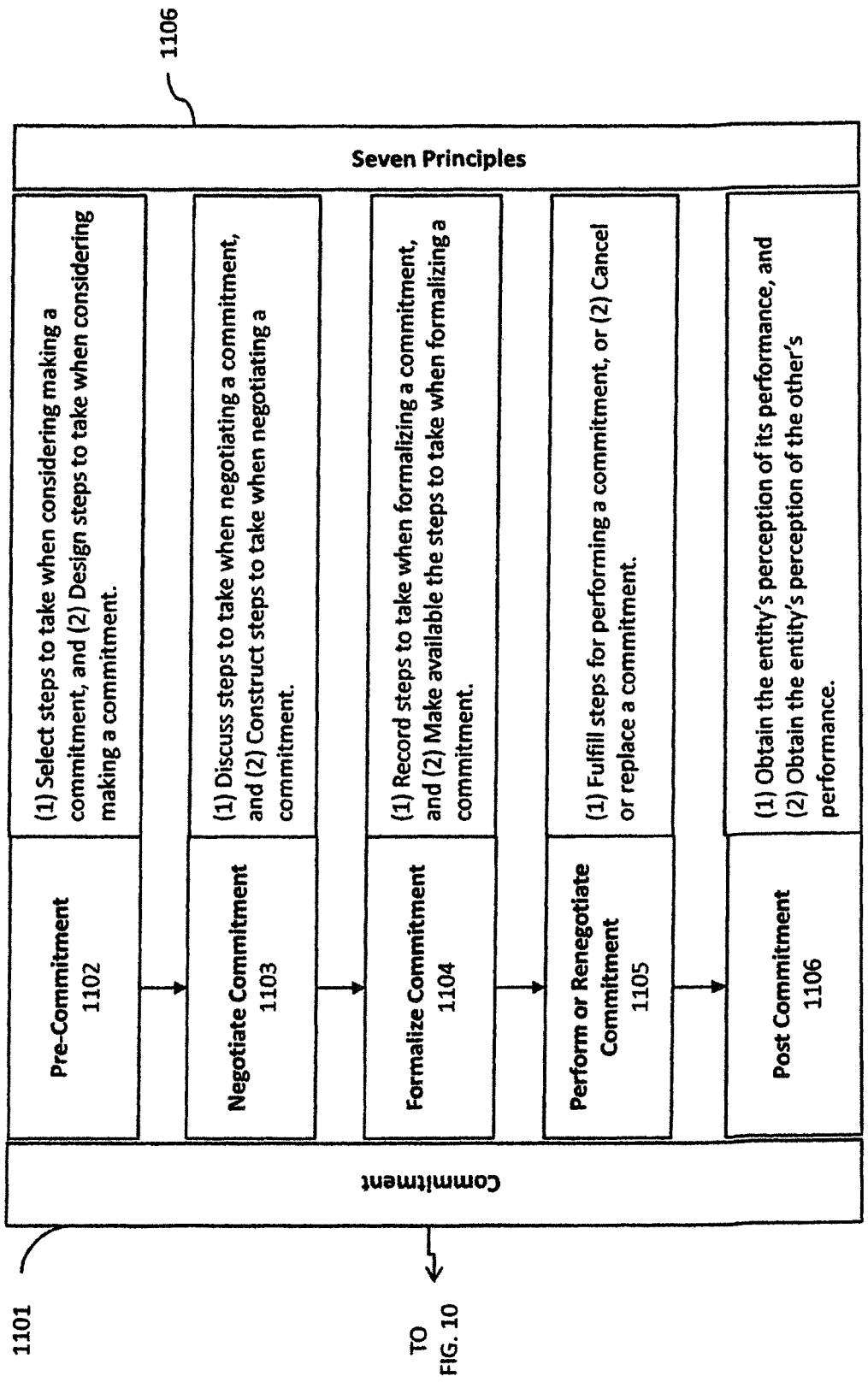
FIG. 11 comprises a flowchart as configured in accordance with various embodiments of these teachings.

A commitment interaction type 1002, in this example, constitutes a simple sentence (i.e., constituting only a single clause) that contains a single, transitive verb that acts on a single entity (such as a promise made by one entity to another). Referring momentarily to FIG. 11, a given commitment can be developed via a series of steps.

At a first pre-commitment step 1102, one or more steps to be taken when considering making a commitment are selected and then steps to take when considering making a commitment are designed. At a "negotiate commitment" step 1103, steps to take when negotiating a commitment are discussed and then constructed. At a "formalized commitment" step 1104, steps to take when formalizing a commitment are recorded and then made available for use. At a perform or renegotiate commitment step 1105, steps for performing a commitment are fulfilled or, in the alternative, the commitment is canceled or replaced. And at a post commitment step 1106, the relevant entity's perception of its own performance is obtained as is the entity's perception of the other entity's performance with respect to the commitment.

Figure 12:
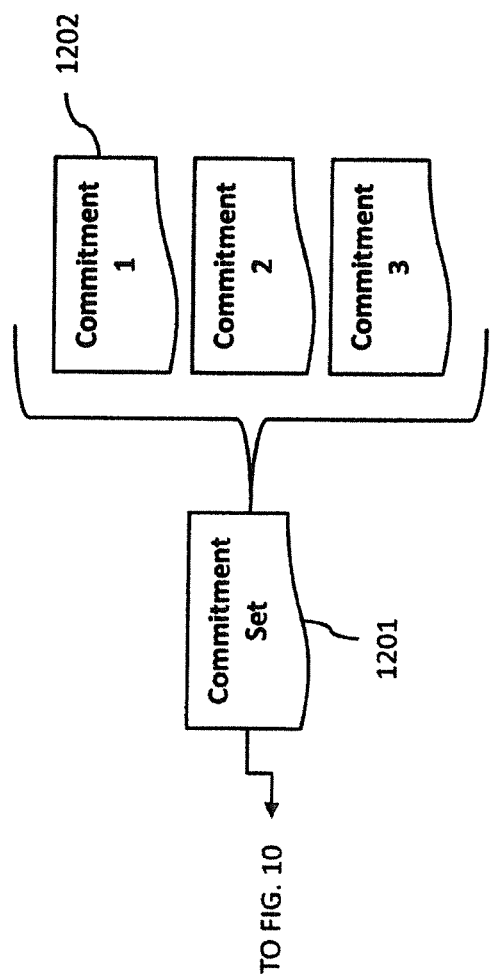
FIG. 12 comprises a commitment set detail view as configured in accordance with various embodiments of these teachings.

Referring again to FIG. 10, a commitment set 1003 in this example constitutes a group of commitments designed to accomplish a procedural task or follow a step-by-step methodology. Referring momentarily to FIG. 12, a given commitment set 1003/1201 accordingly comprises two or more associated commitments 1202. These teachings will accommodate a variety of different types of association that can serve in these regards. Illustrative examples in those regards include, but are not limited to, commitments that are associated by virtue of the type of contemplated performance, the time for performance, similarities or differences between the entities involved or affected by the commitment, performance milestones, performance requirements or predicates such as necessary skills or available resources, and so forth.

Figure 13:
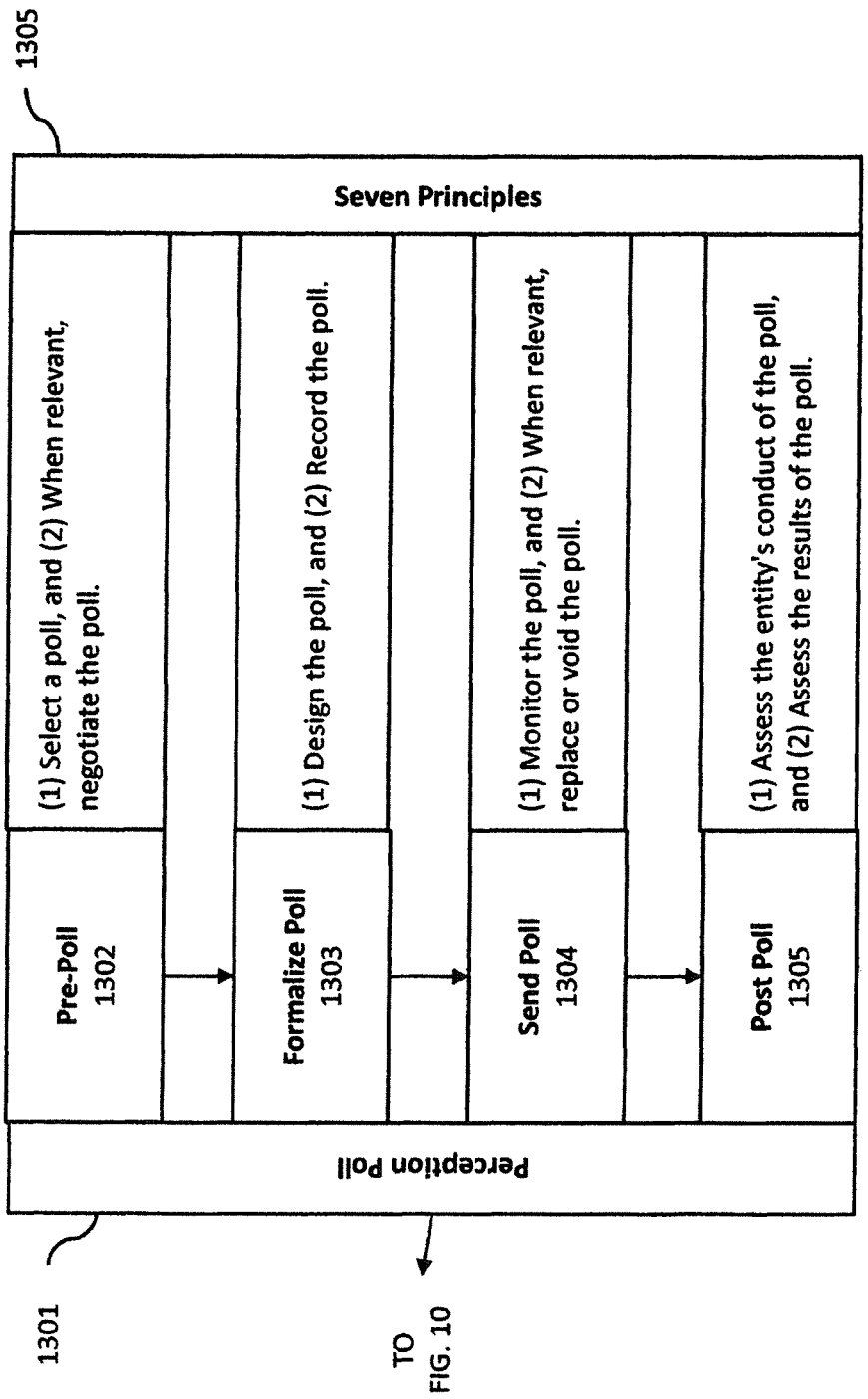
FIG. 13 comprises a flow chart as configured in accordance with various embodiments of these teachings.

Referring again to FIG. 10, the above-mentioned perception poll 1004 refers to a commitment set designed to capture a person's thoughts or feelings regarding an entity (noun), or of an entity's commitment (verb). Perception polls can be sent by any entity to obtain human perceptions in these regards. Referring momentarily to FIG. 13, a given perception poll 1000/1301 can be formed by first conducting a pre-poll activity 1302 comprising first selecting a poll and, when appropriate, negotiating the contents of that poll. At a formalized poll step 1303 the poll is then designed and recorded. At a send poll step 1304 the poll is monitored and, when appropriate, replaced or voided (for example, when an insufficient number of responses are received and/or when a poll is not received from a person deemed necessary to the response). At a post poll step 1305, the entity's conduct of the poll is assessed as are the results of the poll. By one approach, and as illustrated in FIG. 13, the foregoing activities are informed, guided, and/or constrained by seven principles 1305 that are described further herein.

Figure 14:
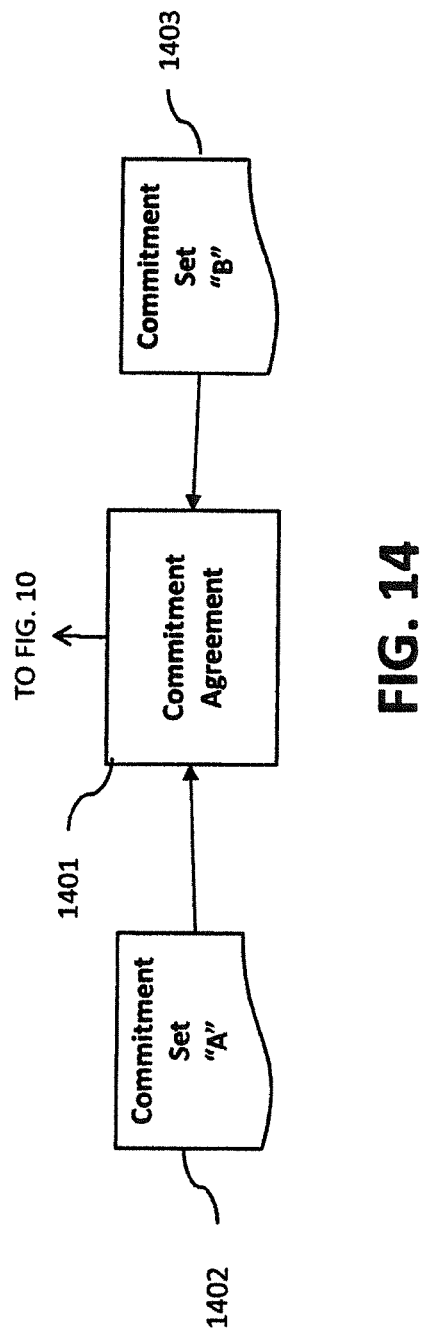
FIG. 14 comprises commitment agreement detail view as configured in accordance with various embodiments of these teachings.

Referring again to FIG. 10, the above-mentioned commitment agreement 1005 refers to commitment sets that are to be fulfilled by two separate entities (or more). The commitment sets can be identical or different from one another as appropriate to the needs of the application setting. Referring momentarily to FIG. 14, this figure presents an example of a first commitment set "A" 1402 and a second commitment set "B" 1403 that both inform and define a particular commitment agreement 1401.

Figure 15:
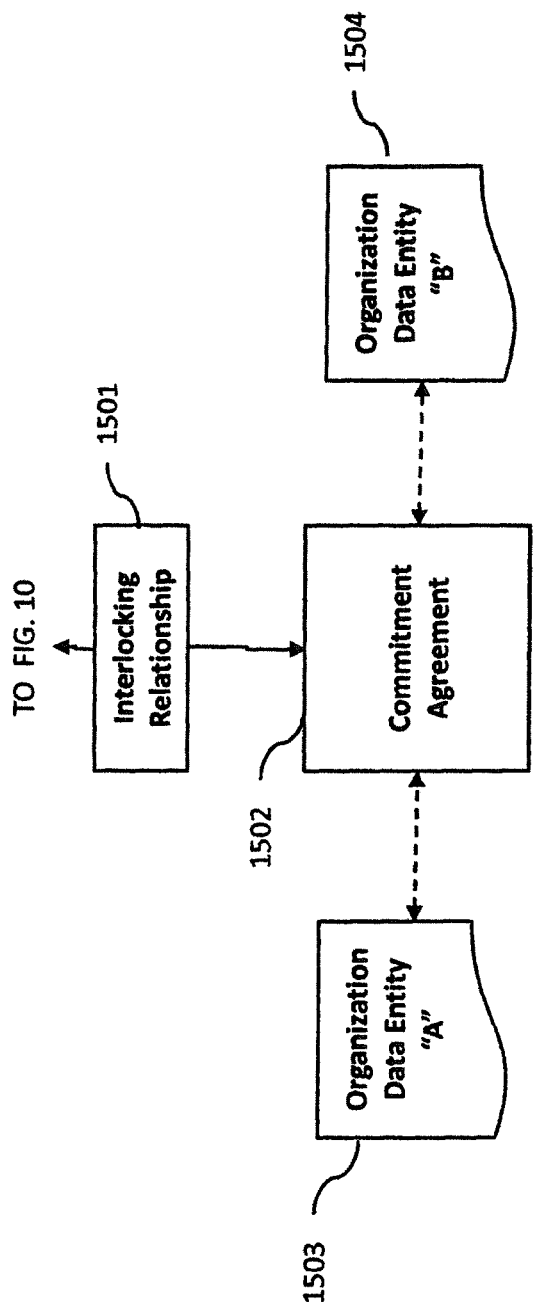
FIG. 15 comprises a further commitment agreement detail view as configured in accordance with various embodiments of these teachings.

Referring again to FIG. 10, the above-described interlocking relationship 1006 refers to a commitment agreement between same-type enterprise entities (such as work groups, positions, products, or assets) designed to meet a specific mutual goal. Referring momentarily to FIG. 15, this figure presents an example where a first organization data entity "A" 1503 and a second organization data entity "B" 1504 are both party to a commitment agreement 1502 to thereby characterize a particular interlocking relationship 1501.

Figure 18:
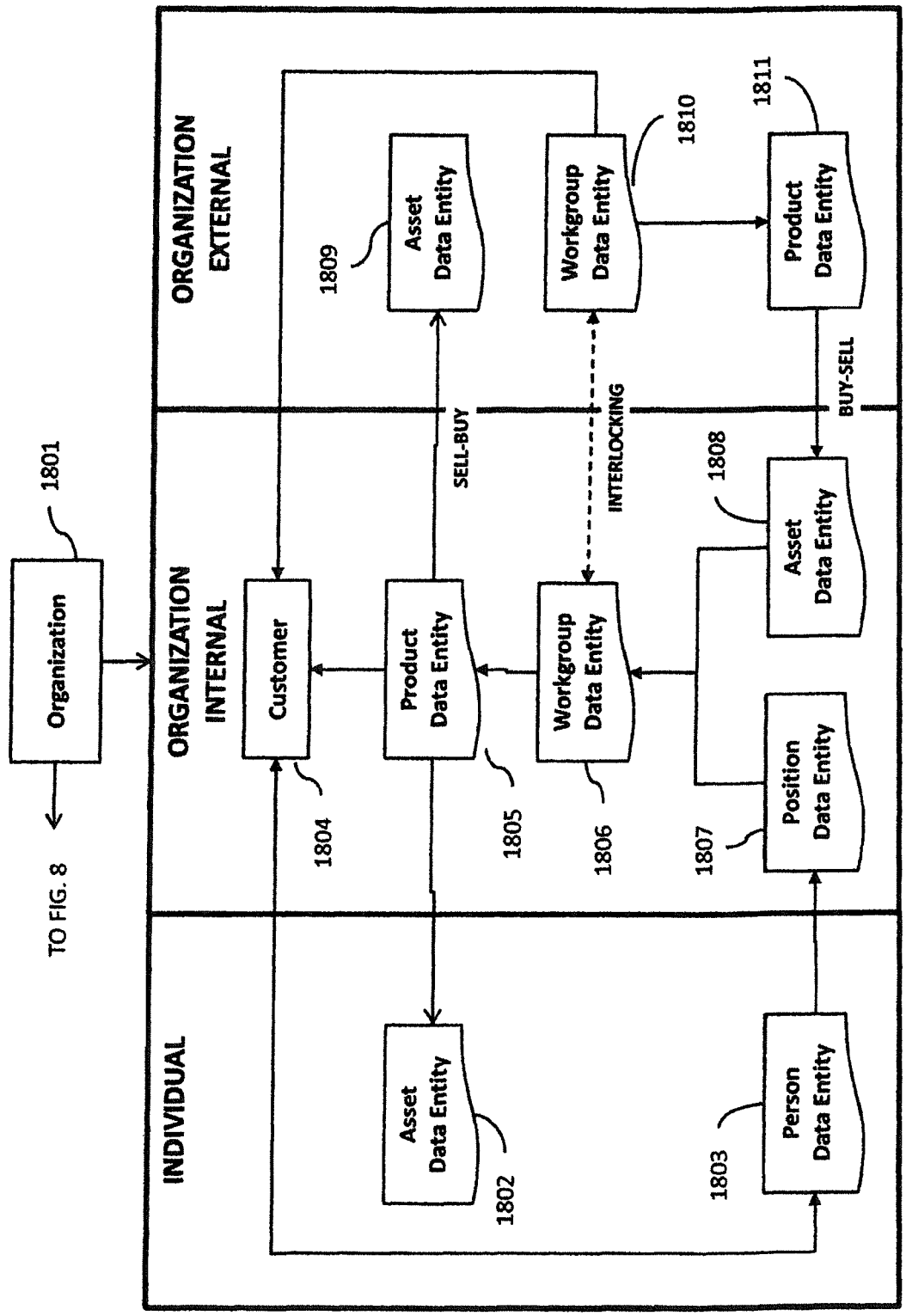
FIG. 18 comprises a model illustration configured in accordance with various embodiments of these teachings.

Referring again to FIG. 8, a third defining aspect of a model 801 consists of organization information 804. Referring momentarily to FIG. 18, an organization 1801 places a customer 1804 at its center by means of data entities. The customer is linked to product entities 1805 that are produced by workgroups 1806. The workgroups in this example consist of job positions 1807 and assets 1808. Positions are held by persons 1803. Assets are provided by suppliers 1811. When an individual buys a product, the product is an asset 1802 of the individual. When an organization buys a product from an external organization, the product 1805 of the seller becomes the asset 1809 of the buyer. To meet specific customer needs, a first workgroup 1806 of an organization can create an interlocking relationship 1006 with a second workgroup 1810 of an external organization.

Referring again to FIG. 8, a fourth defining aspect of a model 801 consists of seven principles 805. Referring momentarily to FIG. 17, these seven principles 805/1701 are as follows.

The first principle, accountability 1702, constitutes of acceptance of liability for the consequences of choices as well as consideration of the long-term effect of one's actions. The second principle, boundaries 1703, constitutes limitations imposed to indicate what is permissible within one's value system. The third principle, honesty 1704, constitutes the quality of communicating and acting truthfully, stating facts and views as best as possible, both internally and to others. The fourth principle, respect 1705, constitutes the positive feeling of esteem for self or for another. The fifth principle, responsibility 1706, constitutes the sense that one's own actions are the source or cause of outcomes, and further encompass the ability to act without guidance or superior authority. The sixth principle, support 1707, constitutes the act of giving help, moral or psychological assistance, or advocacy, either on behalf of oneself or to another. And the seventh principle, trust 1708, constitutes the confident expectation of another's reliability or of one's own reliability.

The extent to which an entity exhibits (or is perceived to exhibit) any of these principles can be represented in a metricized manner, such as an integer value on a scale of 1 to 10. Depending upon the needs of a particular application setting, these teachings will also accommodate, if desired, weighting a representative value for one or more of these principles in order to have a greater or lesser relative importance as appropriate.

Figure 19:
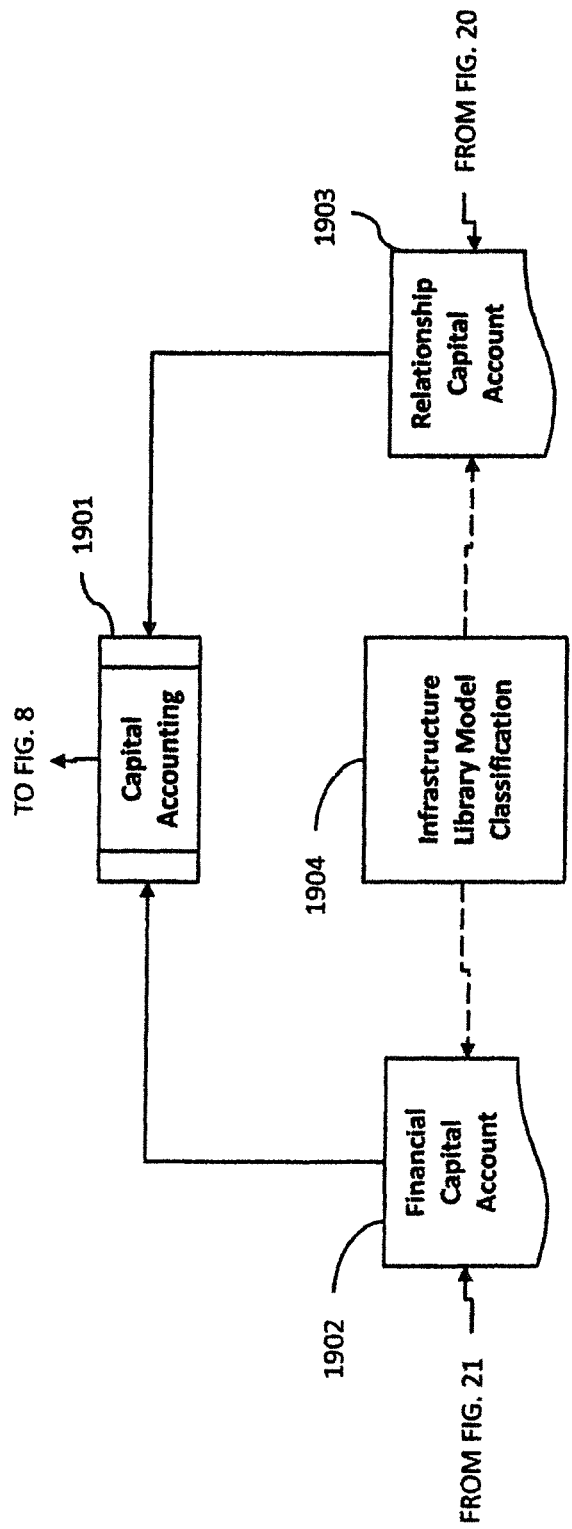
FIG. 19 comprises a detail view as configured in accordance with various embodiments of these teachings.

Referring again to FIG. 8, a fifth defining aspect of a model 801 consists of capital accounting information 806. Referring momentarily to FIG. 19, by one approach this capital accounting information 806/1901 represents both a financial capital account 1902 and a relationship capital account 1903 (where both accounts are related according to a classification system 1904 established and/or otherwise observed by the model).

Figure 21:
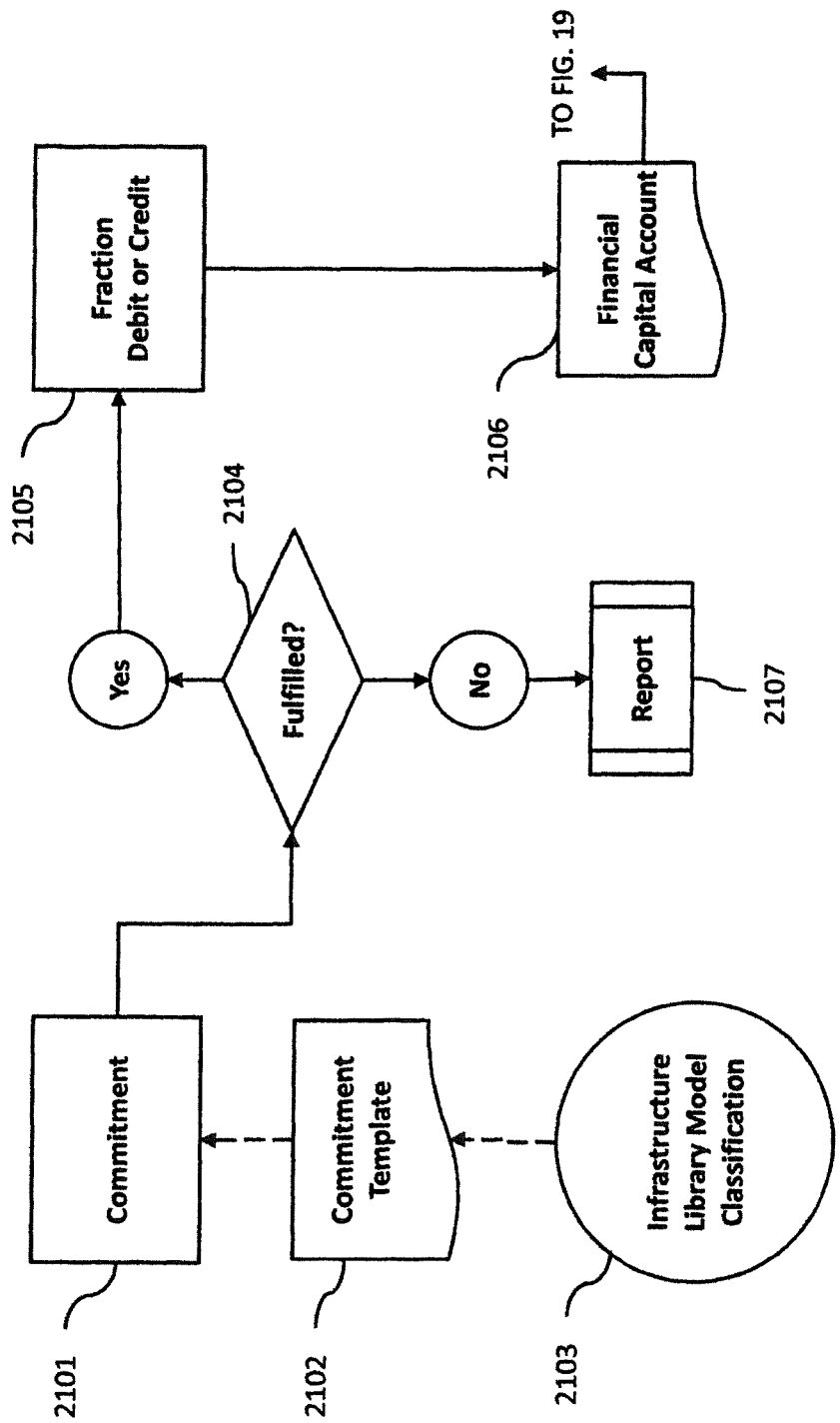

Referring momentarily to FIG. 21, the aforementioned financial capital account 1902 can be developed using a process that essentially begins with a financial field in a selected commitment 2101 that is based on a pre-defined commitment template 2102 that has been identified by the model's classification system 2103. Upon detecting, at decision block 2104, fulfillment of the commitment, the value of the financial field 2105 is posted to a corresponding financial capital account 2206. When the commitment goes unfulfilled, this process provides for recording the value of the financial field and a corresponding report 2107.

Figure 20:
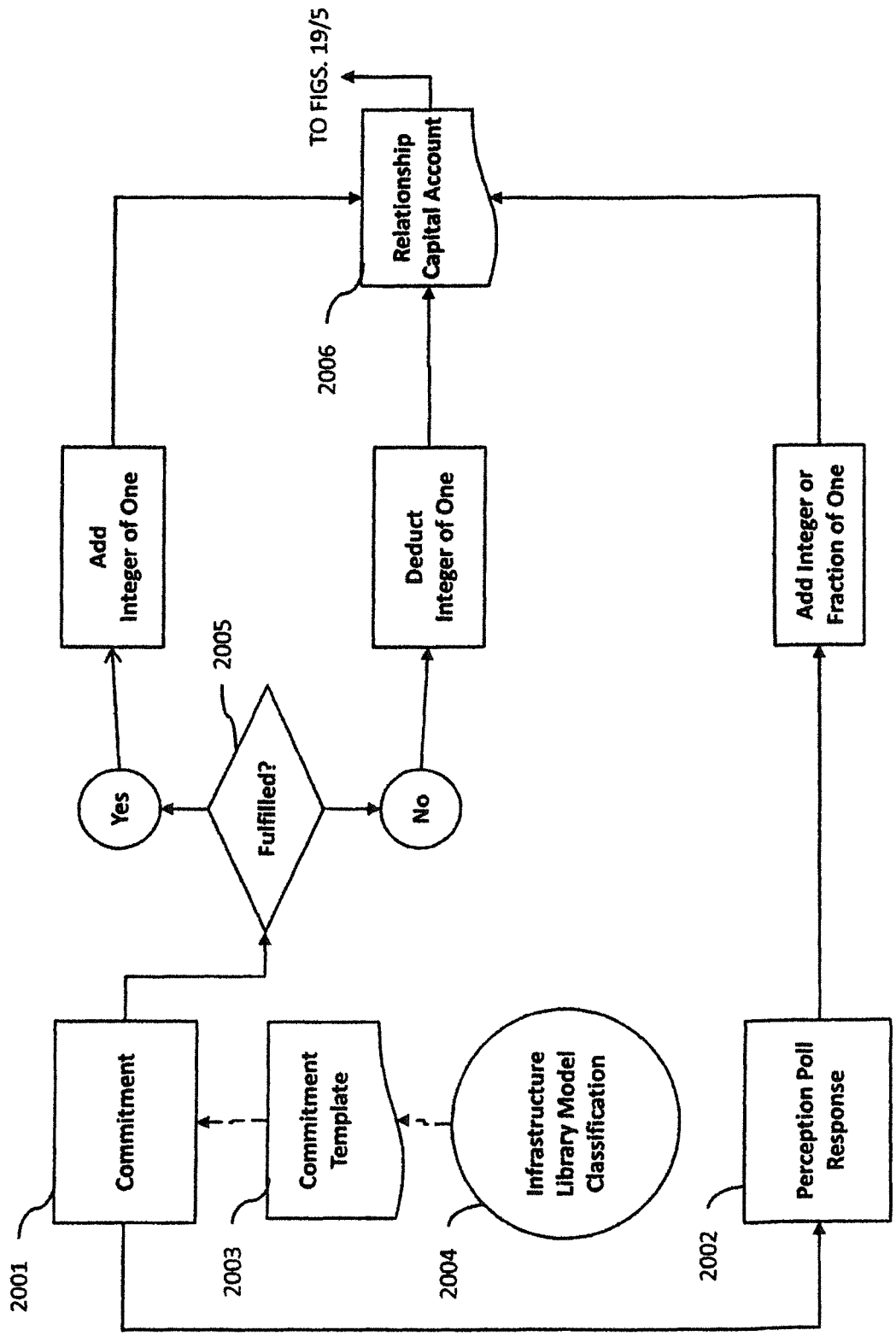
FIG. 20 comprises a flowchart as configured in accordance with various embodiments of these teachings FIG. 21 comprises a flowchart as configured in accordance with various embodiments of these teachings.

Referring momentarily to FIG. 20, the aforementioned relationship capital account 1903 can be developed using a process that begins with either a single commitment 2001 (based, for example, on a predefined commitment template 2003 as identified by the model's classification system 2004) or a commitment contained in a perception poll 2002. Upon detecting, at decision block 2005, fulfillment of the aforementioned commitment, an integer of 1 is posted to a relationship capital account 2006. A lack of fulfillment results instead in an integer of −1 being recorded/summed in the relationship capital account 2006. In a somewhat similar manner, the aforementioned perception poll response 2002 can result in adding an integer (or, if desired, a fraction of 1) to the aforementioned relationship capital account 2006.

Figure 22:
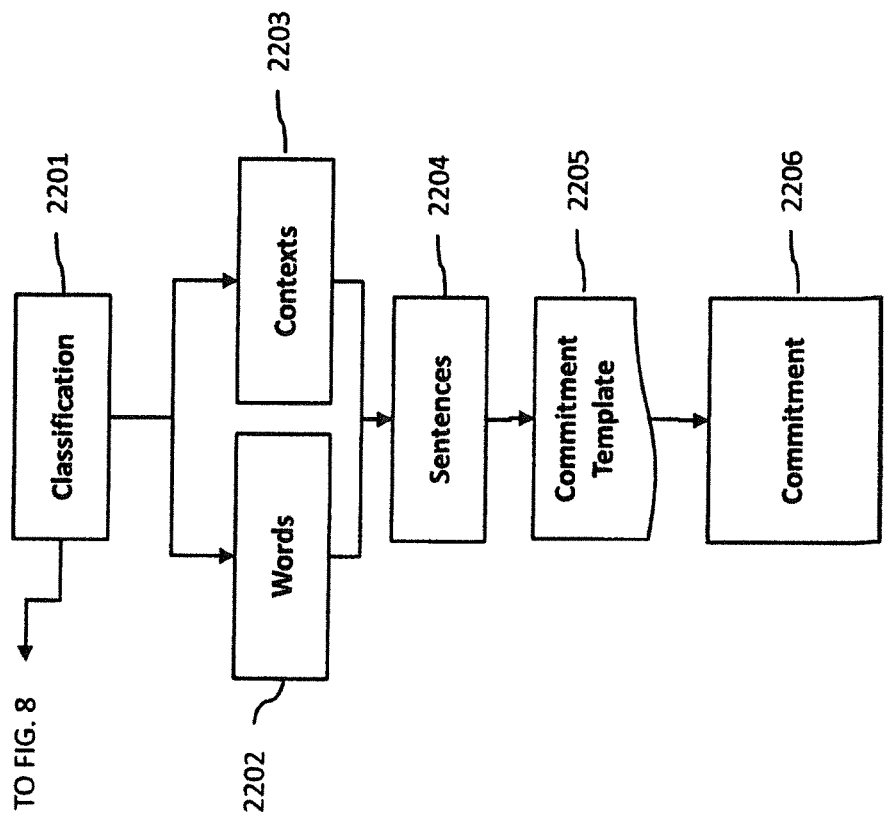
FIG. 22 comprises a flowchart as configured in accordance with various embodiments of these teachings.

Referring again to FIG. 8, a sixth defining aspect of a model 801 consists of classification information 807. Referring momentarily to FIG. 22, the nature of the non-human agent's response can be automatically derived as a function, at least in part, of an information relevance measurement. Relevance to the user is determined by this infrastructure's classification system. The classification 2201 system comprises words 2202 which can be combined to form common sentences 2204, and contexts 2203, the settings of events that precede the sentences. Commitment templates 2205 are built and derive meaning from contextual sentences. The templates are made available to help users save time in the creation of commitments 2206 for particular needs.

Figure 16:
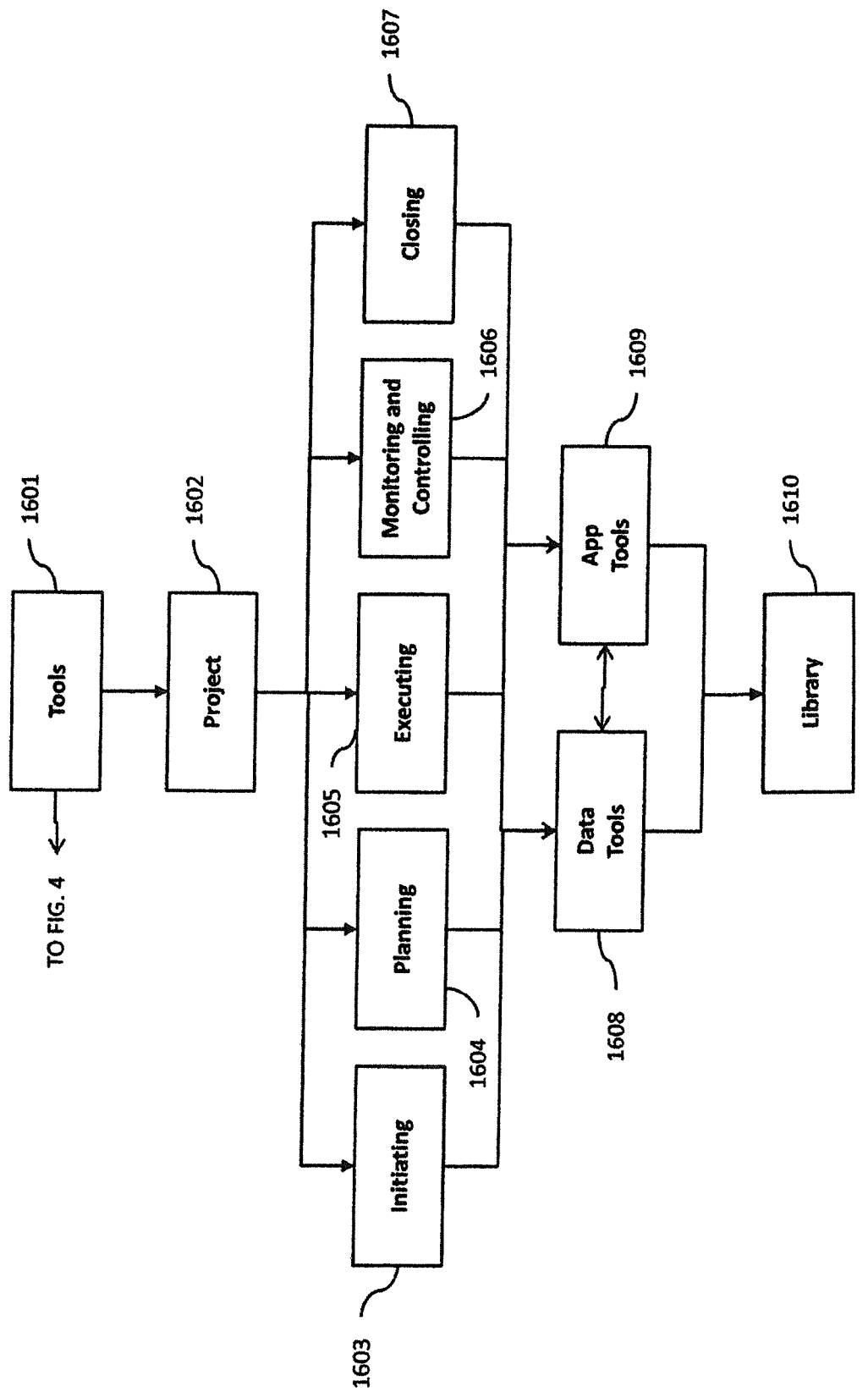
FIG. 16 comprises a block diagram view as configured in accordance with various embodiments of these teachings.

Referring again to FIG. 4, as mentioned above the above-mentioned model 403 serves at least in part to create collaborative software tools 404. Referring now to FIG. 16, an illustrative example in these regards is provided. In this example, the tools 1601 are designed to enable users to collaboratively manage this infrastructure's library 1610. They include a project facility 1602 that enables users in initiating 1603, planning 1604, executing 1605, monitoring and controlling 1606, and closing 1607 projects related to infrastructure data and applications. The project facility makes use of data tools 1608 and application tools 1609 to fulfill project goals.

Figure 3:
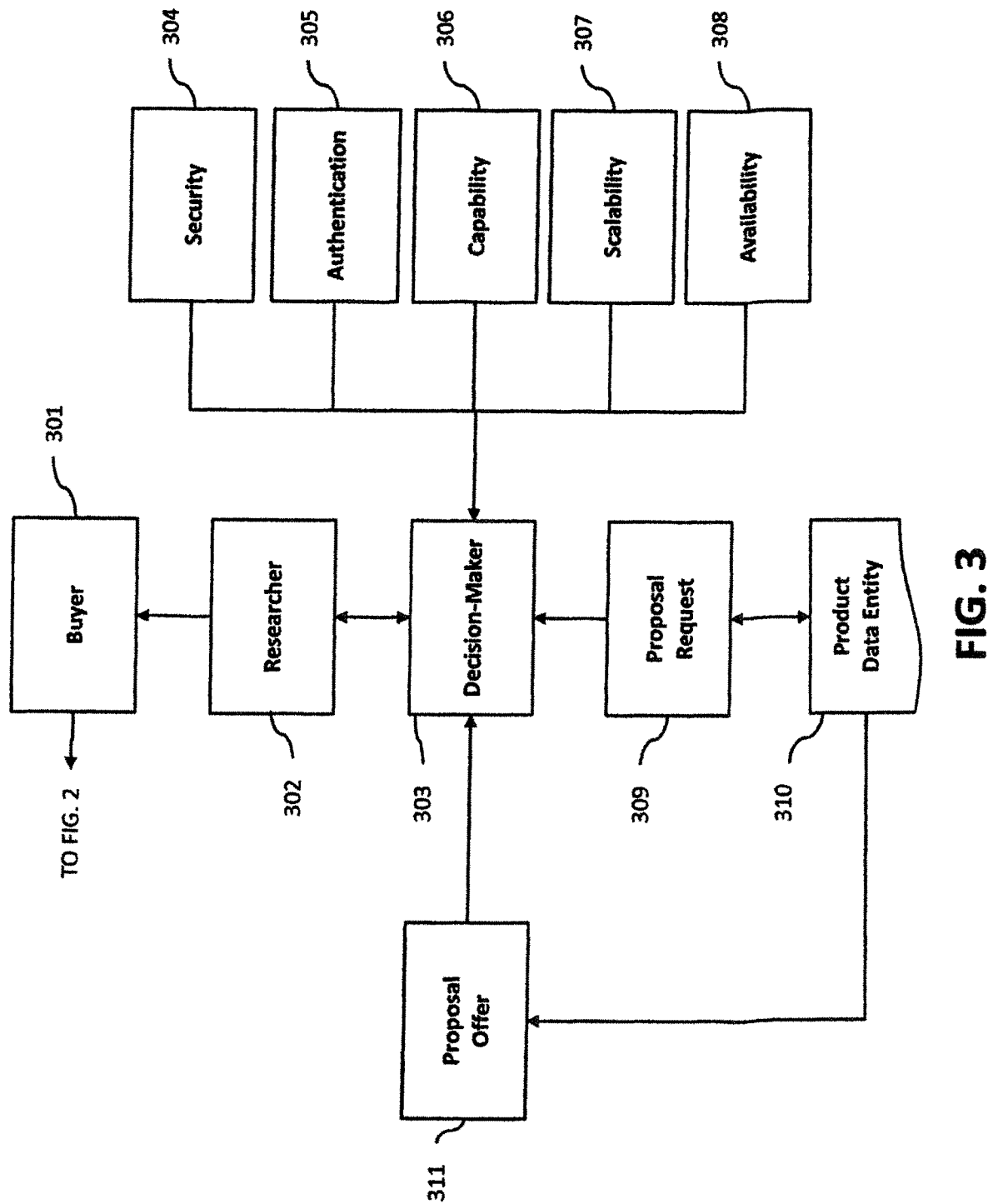
FIG. 3 comprises a flowchart as configured in accordance with various embodiments of these teachings.

Referring again to FIG. 2, as mentioned above these teachings will optionally accommodate accounting for a so-called buyer 206. FIG. 3 provides a specific illustrative example in these regards. This "buyer" 206/301 constitutes a capability that the aforementioned dispatcher 203 can selectively utilize. As illustrated, this buyer 206/301 includes a researcher 302 and a decision-maker 303 that serve to determine the aforementioned infrastructure's demonstrated security 304, authentication 305, capability 306, scalability 307, and availability 308.

The decision-maker 303 can serve to determine the issuance of proposal requests 307 and to record evaluated responses for corresponding products 310. These teachings will also accommodate permitting the decision-maker 303 to receive proposal offers 311 from infrastructure entities that supply the aforementioned products.

Figure 7:
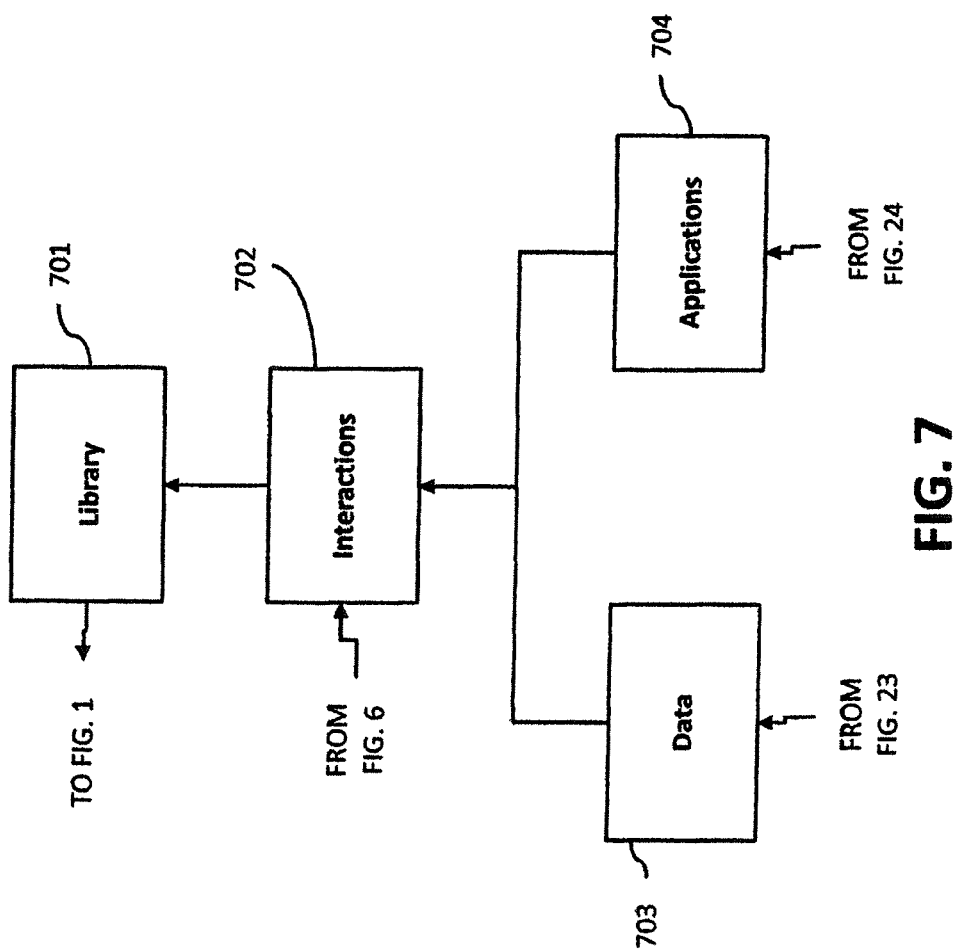
FIG. 7 comprises a flowchart as configured in accordance with various embodiments of the invention.

Referring now to FIG. 7, the aforementioned library 105/701 can also contain or otherwise be informed by information regarding interactions 702. With momentary reference to FIG. 6, these interactions 702/601 can be tested for relevance 602 based on capital accounting information 603 with respect to commitments 604 and perceptions 605 that are related to, and of interest to, the user. Referring again to FIG. 7, and viewed a bit more generally, these interactions 702/601 can pertain to data 703 and applications 704.

Figure 23:
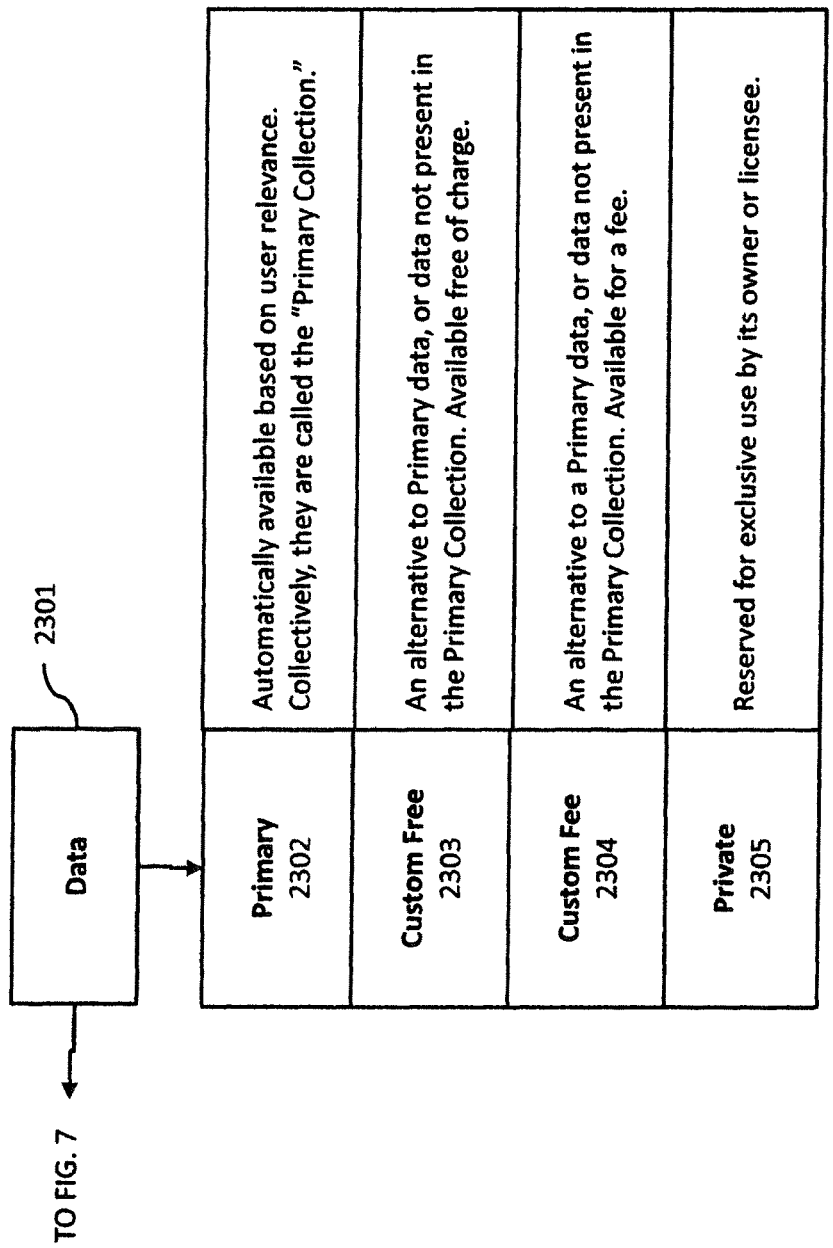
FIG. 23 comprises a data-type chart as configured in accordance with various embodiments of these teachings.

With respect to the data component 703, and referring momentarily to FIG. 23, various accommodated types of data 703/2301 include but are not limited to primary data 2302, custom free data 2303, custom fee data 2304, and private data 2305. As used herein, primary data 2302 will be understood to refer to data that is automatically available based on user relevance. For many application settings it may be useful to consider this data to be the "primary collection" as pertains to a particular user. Custom free data 2303 will be understood to constitute an alternative to primary data at least in part because this data is not present in the aforementioned primary collection. That said, custom free data is available without charge. Custom fee data 2304 will be understood to also constitute an alternative to any primary data as the data is not present in the primary collection. In this case, however, the data is only available upon providing compensation. And private data 2305 will be understood to constitute data that is reserved for exclusive use by its owner or licensee. That use may or may not be conditioned upon a fee requirement but will typically be burdened by limitations regarding further disclosure, retention, and/or usage.

Figure 24:
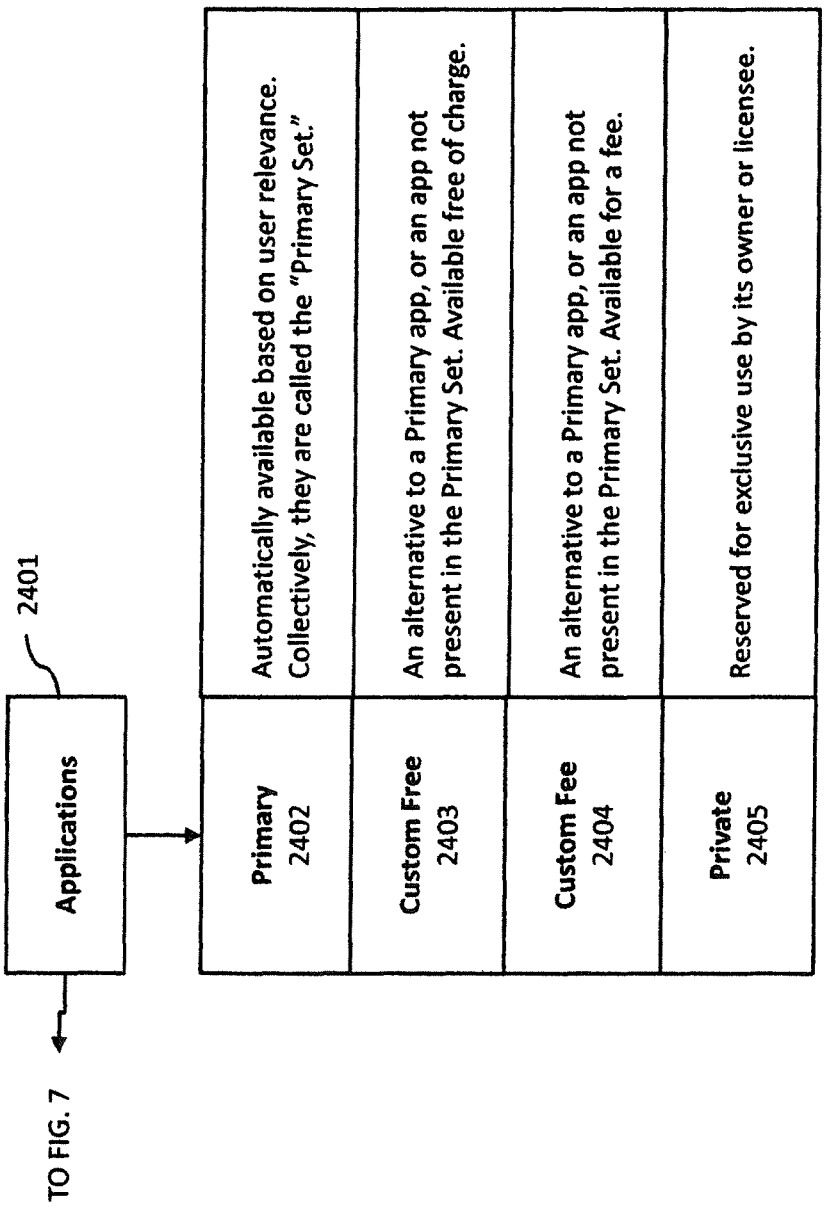
FIG. 24 comprises an application-type chart as configured in accordance with various embodiments of these teachings.

With respect to the application component 704/2401, and referring momentarily to FIG. 24, various accommodated types of applications 704/2401 include primary applications 2402, custom free applications 2403, custom fee applications 2404, and private applications 2405. As used herein, primary applications 2402 will be understood to refer to applications that are automatically available based on user relevance and hence which may be considered to constitute a "primary set" of applications. As used herein, custom free applications 2403 constitute an alternative to primary applications in that they are not present in the primary set. Being "free," custom free applications 2403 are available for use free of charge. As used herein, custom fee applications 2404 are also alternatives to primary applications but are only available upon providing corresponding consideration for use. And private applications 2405 will be understood to constitute applications that are reserved for exclusive use by the owner or licensees of that application. That use may or may not be conditioned upon a fee requirement but will typically be burdened by limitations regarding further disclosure, retention, and/or usage.

Figure 25:
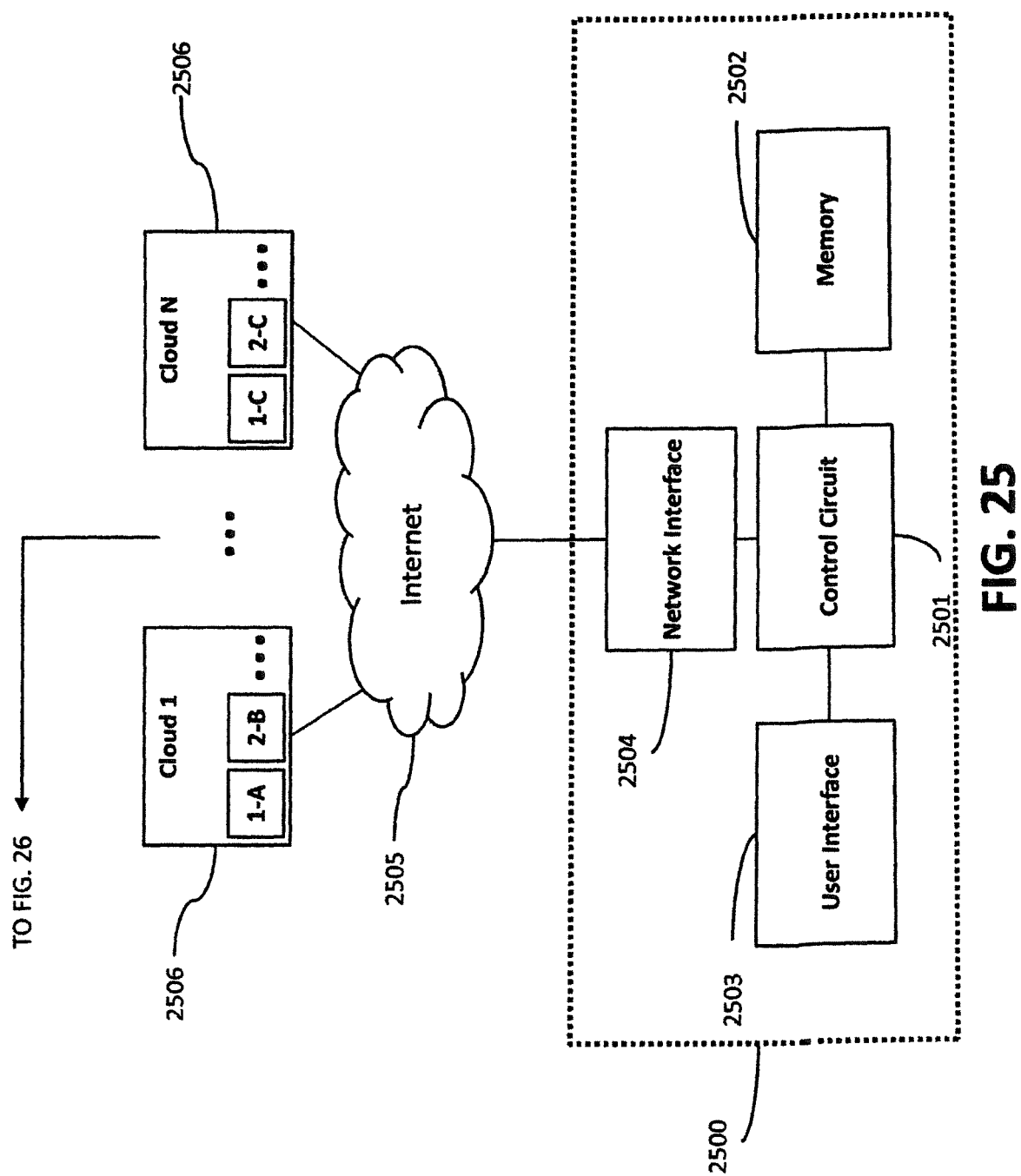
FIG. 25 comprises a block diagram as configured in accordance with various embodiments of these teachings.

The above-described processes are readily enabled using any of a wide variety of available and/or readily configured platforms, including partially or wholly programmable platforms as are known in the art or dedicated purpose platforms as may be desired for some applications. Referring now to FIG. 25, an illustrative approach to such a platform will now be provided.

In this particular example, the enabling apparatus 2500 includes a control circuit 2501. Being a "circuit," the control circuit 2501 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 2501 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 2501 is configured (for example, by using corresponding programming as will be well understood by those skilled in the art) to carry out one or more of the steps, actions, and/or functions described herein.

By one optional approach the control circuit 2501 operably couples to a memory 2502. This memory 2502 may be integral to the control circuit 2501 or can be physically discrete (in whole or in part) from the control circuit 2501 as desired. This memory 2502 can also be local with respect to the control circuit 2501 (where, for example, both share a common circuit board, chassis, power supply, and/or housing) or can be partially or wholly remote with respect to the control circuit 2501 (where, for example, the memory 2502 is physically located in another facility, metropolitan area, or even country as compared to the control circuit 2501).

This memory 2502 can serve, for example, to non-transitorily store the computer instructions that, when executed by the control circuit 2501, cause the control circuit 2501 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The control circuit 2501 operably couples to a user interface 2503. This user interface 2503 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

In this example the control circuit 2501 also operably couples to a network interface 2504 that compatibly and communicatively couples to the Internet 2505. As used herein it will be understood that the expression "Internet" refers to the global system of interconnected computer networks (including private, public, academic, business, and government networks ranging from local to global scope) that uses the Internet protocol suite (including the Transmission Control Protocol (TCP) and the so-called Internet Protocol (IP)) to link devices worldwide. Network interfaces in general, including both wireless and non-wireless platforms, are well understood in the art and require no particular elaboration here.

So configured the control circuit 2501 can communicate with other Internet-connected elements via the network interface 2504. This includes a plurality of elements referred to herein as "clouds" 2506. As used herein, the expression "cloud" will be understood to refer to Internet-accessed server-based computing services (which are typically controlled by a corresponding service provider).

Figure 26:
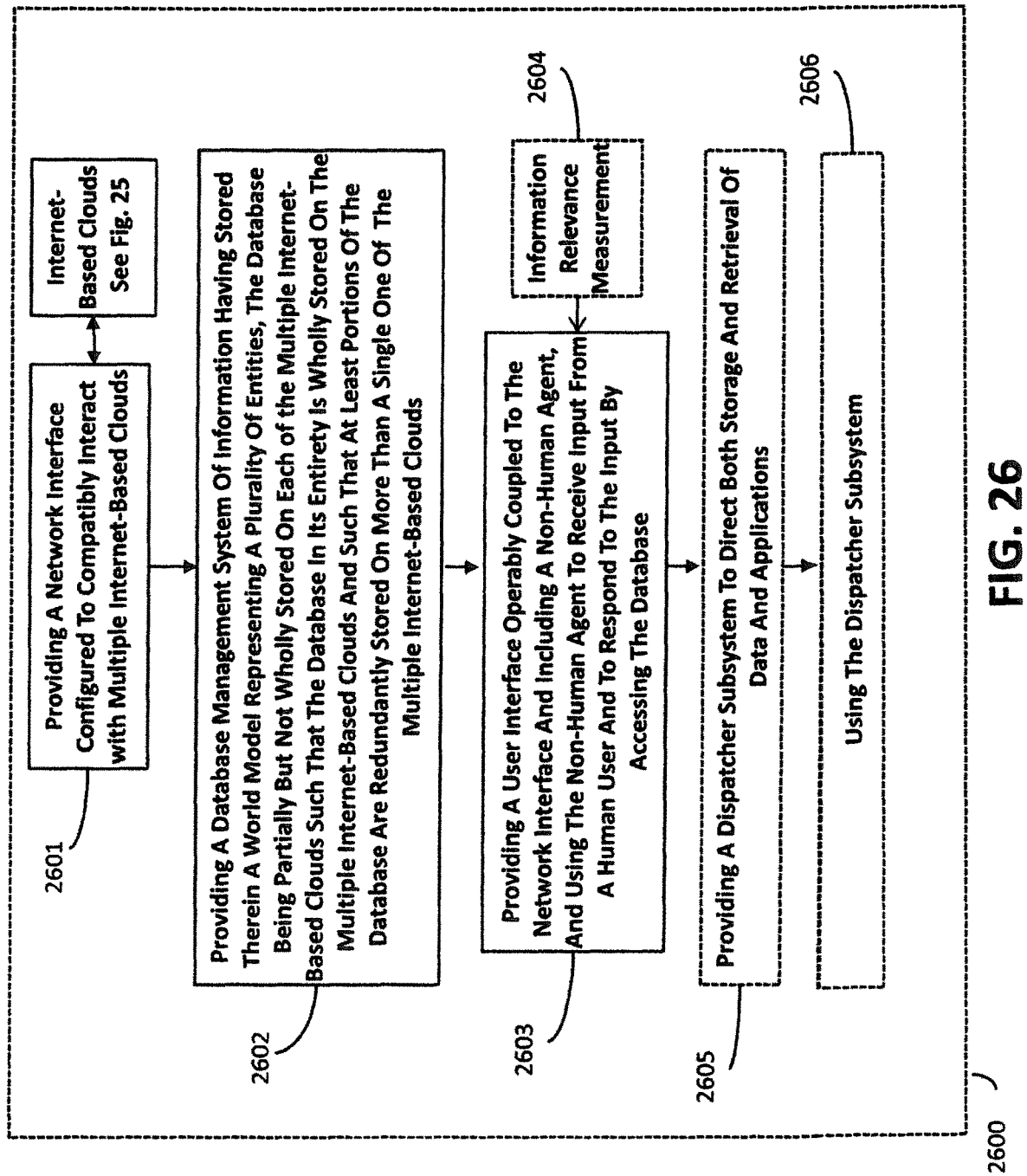
FIG. 26 comprises a flowchart as configured in accordance with various embodiments of these teachings.

FIG. 26 provides a further illustrative example in all of these regards. The illustrated process 2600 provides, at block 2601, for providing a network interface (such as the network interface 2504 described above with respect to FIG. 25) that is configured to compatibly interact with multiple Internet-based clouds (such as the Internet-based clouds 2506 described above with respect to FIG. 25).

At block 2602, this process 2600 provides resources for a database management system of information. By one approach the above-described control circuit 2501 is configured to serve as this database management system. The foregoing information comprises a world model representing a plurality of entities (such as those various entities described above).

The database contents in this illustrative example are partially but not wholly stored on each of the multiple Internet-based clouds 2506. Accordingly, the database in its entirety is wholly stored on the multiple Internet-based clouds 2506 but is not wholly stored on any one of the clouds 2506. By one approach at least portions of the database are redundantly stored on more than a single one of the multiple Internet-based clouds 2506. This approach is generally illustrated in FIG. 25 where it can be seen that cloud 1 stores information items denoted as 1-A and 2-B while cloud N stores information items denoted as 1-C and 2-C, these being different information items than those that are stored in cloud 1.

Such an approach provides both security and privacy for a user's information. Those skilled in the art will also appreciate that the database management functionality of the control circuit 2501 includes storing parsed information in accordance with this approach, maintaining a map or other system for understanding where all the information has been stored, and correctly retrieving information at a time of need and correctly reconstructing that information as necessary to provide a user with seamless and transparent access to their information.

Block 2603 of this process 2600 provides a user interface (such as the above-described user interface 2503) that operably couples to the network interface 2504 (for example, via the above-described control circuit 2501). In this illustrative example the user interface 2503 includes a nonhuman agent such as the above-described avatar. So configured, this block 2603 also serves to facilitate receiving input from a human user via the user interface 2503 and responding to that input by accessing the above-described database in an appropriate and suitable manner.

Figure 27:
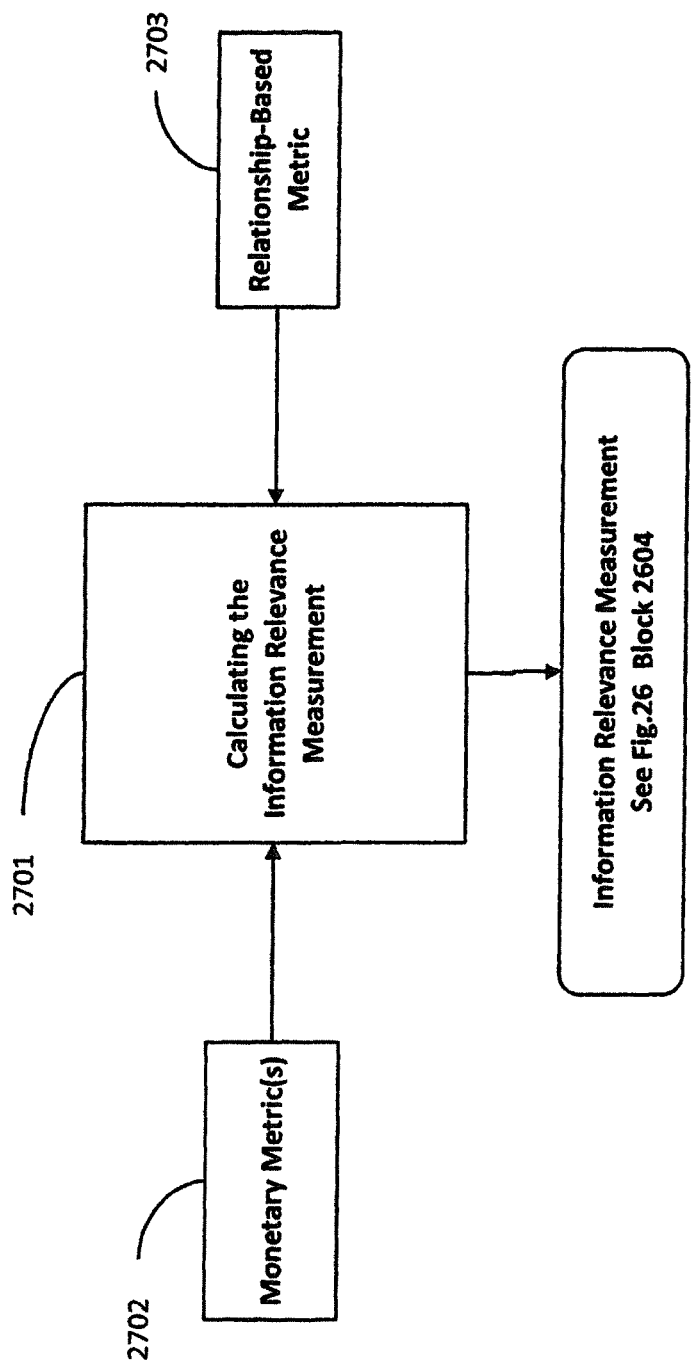
FIG. 27 comprises a flowchart as configured in accordance with various embodiments of these teachings.

By one optional approach, the above-described functionality includes responding to the human user input as a function, at least in part, of an information relevance measurement 2604. Referring momentarily to FIG. 27, this information relevance measurement 2604 can be calculated at block 2701 as desired. By one optional approach this calculation occurs as a function, at least in part, of one or more monetary metrics 2702. In support of this approach, if desired each of the above-described entities (or at least some of them) are assigned a monetary metric account that is credited and debited to reflect corresponding monetary transactions. The latter, when available, can serve as the monetary metric 2702.

By another optional approach, in lieu of the foregoing or in combination therewith, this calculation occurs as a function, at least in part, of one or more relationship-based metrics 2703. For example, an information relevance measurement can be calculated as a function, at least in part, of a workgroup, position, product, asset, human, animal, or plant relationship-based metric. The relationship-based metric itself can constitute or include metrics corresponding to, for example, a fulfilled promise (or promises) and/or human-based perceptions regarding performance (all as discussed above). By one approach, if desired, a particular entity's relationship metric account can be credited with a calculated value for each promise fulfilled by the entity and/or for each positive human perception of the entity.

Referring to FIG. 19, information relevance to the user can be based on a combination of Financial Capital Account 1902 data and Relationship Capital Account 1903 data. (The relevance of relationship capital might be influenced by the wealth of its human owner.)

With continued reference to FIG. 26, at block 2605 these teachings will accommodate providing a dispatcher subsystem to direct both storage and retrieval of data and applications. As with the database manager capability this dispatcher subsystem functionality can be provided by a properly configured control circuit 2501. This dispatcher subsystem can be configured, for example, to determine when additional cloud resources are needed to service the multi-cloud (for example, as a function, at least in part, of definable operational and performance parameters). By one approach the dispatcher subsystem is specifically configured to find, acquire, integrate, and/or test cloud resources in service of the foregoing teachings.

This dispatcher subsystem can also be configured, for example, to signal a buyer apparatus regarding when to act (for example, in response to a particular detected signal or situation). Block 2606, in turn, provides for using the so-configured control circuit 2501 to thereby use the dispatcher subsystem. This usage can serve, for example, to determine when additional cloud resources are needed to service the multi-cloud and/or to signal a buyer apparatus to act.

Some of the capabilities and fluid transparency of the teachings presented herein may be better appreciated in the context of a simple yet comprehensive illustrative example. This example considers a person who must attend work-related meetings once a month at multiple locations. This person is responsible for scheduling the travel to facilitate the foregoing and other corresponding logistics. In particular, these activities include the scheduling activity itself, lodging and flight arrangements, suspension of home mail services and newspaper delivery, and pet sitting. The foregoing activities are both repetitious and time-consuming, often requiring careful manually-coordinated arrangements.

This simple-to-describe activity in fact breaks down into a complex series of steps that the person must perform on a monthly basis. By way of illustration, scheduling a particular meeting will typically require that the person know their own personal and work schedules, rearrange conflicting schedule items as necessary, discover and access the work schedules of other people involved in the meetings, schedule/reserve meeting rooms at remote locations as required, send meeting information for each person as needed, and schedule food and/or drink for the meeting(s) (which may, in turn, require accessing information regarding attendee dietary requirements and/or preferences).

Setting up travel plans will typically require identifying and booking the flight or other travel method to the remote location, identifying and booking a remote travel method (such as a limousine or ride sharing service) to facilitate remote local travel, and identifying and booking accommodations at each remote location.

Arranging for a pet sitter may typically involve contacting the pet sitter and arranging for their scheduled services, acquiring miscellaneous items (such as adequate food and medication) for the pet, and ensuring current vaccinations.

The anticipated travel may also require arranging for residential mail to be held at the post office for the duration of the away time, arranging for travel clothing to be cleaned and returned from the cleaners, preparing a suitcase packing list, and so forth. And, of course, successful conduct of the meetings may include arranging for the taking of meeting notes and the distribution of those notes to attendees as well as identifying and tentatively scheduling follow-up meetings.

Although repetition and experience may eventually lead to some efficiencies as regards the foregoing, significant time and cognitive effort will nevertheless be required. Traditional practices in these regards also carry the risk of error, either through omission or through conflict. Errors in many of these regards can lead to mission failure. Done correctly, such planning is, at best, tedious and time-consuming. Done incorrectly, frustrating and unsuccessful can be added to the former.

The multi-cloud infrastructure described herein, including the database and multi-cloud user interface 2503 (which itself includes the non-human agent) provides defined connections to all user-relevant entities within a highly-secure, reliable, private, and best practices-enabled environment. Per the foregoing this environment measures the relationships between the entities as well as other entities that are offered as connections to other relevant users via, for example, their non-human agents. Users, supported by this approach, can work with entities that are superior at fulfilling their corresponding measured promises as recorded in the above-describe relationship capital metric.

This illustrative example assumes that the user has already created (or had created for them) an avatar. This illustrative example also assumes that other relevant entities already exist within the above-described infrastructure.

Per these teachings, pre-described best practices that cover the actions required for the user's work-related travel are already available within the infrastructure. Best practices, for example, are created by an avatar owner or a group of users with common needs. These best practices are converted into commands for process and logic rules used, for example, by a software cloud-based assistive intelligence that supports the avatar's ability to perform user authorized tasks.

The user or other relevant entity triggers an activity request of the avatar platform. The infrastructure then applies, for example, logic and best-practice methods to analyze, prepare, and obtain approvals (when necessary) from the user (or relevant others) to perform the multiple steps of each activity. The infrastructure further serves to automatically acquire, as necessary, information and other responses from the user and other relevant entities.

Working in the background, the above-described infrastructure effects multi-cloud data access and retrieval as well as dispatcher and buyer functionality. That dispatcher capability manages data access and triggers a buyer function when there is a change in space or resource needs. For example, if the documents or other data grow while conducting best practices, the described infrastructure will adjust dynamically to match the required resources.

The overall effect is that the substantial effort previously needed to plan and conduct such a trip is reduced effectively to travel time alone and a few minutes interacting with the user interface 2503 in a dynamic and as-needed manner. Quite literally, the trip scheduling, travel plans, pet sitter arrangements, travel clothing, suitcase packing list, meeting notetaking and distribution, and so forth can all be arranged with little or no present effort or cognitive loading on the user.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A multi-cloud user interface apparatus to facilitate transparent use of multiple Internet-based clouds, the multi-cloud user interface apparatus comprising:
   a network interface configured to compatibly interact with the multiple Internet-based clouds;
   a control circuit operably coupled to the network interface and configured as a database management system of information having stored therein a world model representing a plurality of entities, the database being partially but not wholly stored on each of the multiple Internet-based clouds such that the database in its entirety is wholly stored on the multiple Internet-based clouds and such that at least portions of the database are redundantly stored on more than a single one of the multiple Internet-based clouds;
   a user interface operably coupled to the control circuit and wherein the control circuit is further configured to provide the user interface with a non-human agent that comprises, at least in part, an avatar for the human user, the non-human agent configured to receive input from a human user and to respond to the input from the human user as a function, at least in part, of an information relevance measurement by accessing the database.

2. The multi-cloud user interface apparatus of claim 1 wherein the information relevance measurement is calculated as a function, at least in part, of a monetary metric.

3. The multi-cloud user interface apparatus of claim 1 wherein the information relevance measurement is calculated as a function, at least in part, of a workgroup, position, product, asset, human, animal or plant relationship-based metric.

4. The multi-cloud user interface apparatus of claim 3 wherein the relationship-based metric includes metrics corresponding to at least one of:
   fulfilled promises; and
   human-based perceptions regarding performance.

5. The multi-cloud user interface of claim 1 wherein the information relevance measurement is calculated as a function, at least in part, of both a monetary metric, and an entity relationship-based metric.

6. The multi-cloud user interface apparatus of claim 1 wherein the control circuit is configured to present via the user interface the visual avatar as at least one of a two-dimensional animated avatar, a three-dimensional animated avatar, an audio-based avatar, and a text-based avatar.

7. The multi-cloud user interface apparatus of claim 1 wherein the control circuit is further configured as:
   a broker subsystem made up of a dispatcher subsystem to direct both storage and retrieval of data and applications, and a buyer subsystem to determine when additional cloud resources are needed to service the multi-cloud and to signal a buyer apparatus to act.

8. The multi-cloud user interface apparatus of claim 7 wherein the dispatcher subsystem is further configured to determine when additional cloud resources are needed to service the multi-cloud and to signal a buyer apparatus to act.

9. The multi-cloud user interface apparatus of claim 8 wherein the dispatcher subsystem is further configured to find, acquire, integrate, and test cloud resources.

10. The multi-cloud user interface apparatus of claim 8 wherein the dispatcher subsystem is further configured to determine when additional cloud resources are needed as a function, at least in part, of definable operational and performance parameters.

11. A method to facilitate transparent use of multiple Internet-based clouds, the method comprising:
    providing a network interface configured to compatibly interact with the multiple Internet-based clouds;
    providing a control circuit that is operably coupled to the network interface and that is configured as a database management system of information having stored therein a world model representing a plurality of entities, the database being partially but not wholly stored on each of the multiple Internet-based clouds such that the database in its entirety is wholly stored on the multiple Internet-based clouds and such that at least portions of the database are redundantly stored on more than a single one of the multiple Internet-based clouds;
    providing a user interface that is operably coupled to the control circuit and wherein the control circuit is further configured to provide the user interface with a non-human agent that comprises, at least in part, an avatar for the human user, and to use the non-human agent to receive input from a human user and to respond to the input from the human user as a function, at least in part, of an information relevance measurement by accessing the database.

12. The method of claim 11 wherein the control circuit is further configured to calculate the information relevance measurement as a function, at least in part, of a monetary metric.

13. The method of claim 11 wherein the control circuit is further configured to calculate the information relevance measurement as a function, at least in part, of a workgroup, position, product, asset, human, animal or plant relationship-based metric.

14. The method of claim 13 wherein the relationship-based metric includes metrics corresponding to at least one of:
    fulfilled promises; and
    human-based perceptions regarding performance.

15. The method of claim 11 wherein the control circuit is further configured to calculate the information relevance measurement as a function, at least in part, of both a monetary metric, and an entity relationship-based metric.

16. The method of claim 11 wherein the control circuit is further configured to:
    provide a dispatcher subsystem to direct both storage and retrieval of data and applications.

17. The method of claim 16 wherein the control circuit is further configured to:
    use the dispatcher subsystem to determine when additional cloud resources are needed to service the multi-cloud and to signal a buyer apparatus to act.

* * * * *